United States Patent
Oota

(10) Patent No.: US 10,596,784 B2
(45) Date of Patent: Mar. 24, 2020

(54) INTERLAYER FOR LAMINATED GLASS AND LAMINATED GLASS

(71) Applicant: SEKISUI CHEMICAL CO., LTD., Osaka, Osaka (JP)

(72) Inventor: Yuusuke Oota, Kouka (JP)

(73) Assignee: SEKISUI CHEMICAL CO., LTD., Osaka (JP)

(*) Notice: Subject to any disclaimer, the term of this patent is extended or adjusted under 35 U.S.C. 154(b) by 47 days.

(21) Appl. No.: 15/759,514

(22) PCT Filed: Sep. 27, 2016

(86) PCT No.: PCT/JP2016/078400
§ 371 (c)(1),
(2) Date: Mar. 12, 2018

(87) PCT Pub. No.: WO2017/057334
PCT Pub. Date: Apr. 6, 2017

(65) Prior Publication Data
US 2019/0143649 A1 May 16, 2019

(30) Foreign Application Priority Data

Sep. 28, 2015 (JP) ................................. 2015-189939

(51) Int. Cl.
*B32B 17/10* (2006.01)
*B32B 27/08* (2006.01)
(Continued)

(52) U.S. Cl.
CPC ........ *B32B 17/10568* (2013.01); *B32B 3/263* (2013.01); *B32B 17/10036* (2013.01);
(Continued)

(58) Field of Classification Search
None
See application file for complete search history.

(56) References Cited

U.S. PATENT DOCUMENTS 4,452,840 A * 6/1984 Sato .......................... B32B 3/30
428/156
5,013,134 A * 5/1991 Smith ............... B32B 17/10568
345/7
(Continued)

FOREIGN PATENT DOCUMENTS

CN 104880825 A * 9/2015
DE 4227582 A1 * 2/1993 ....... B32B 17/10036
(Continued)

OTHER PUBLICATIONS

Machine Translation of JP 08-143345 A, Jun. 1996 (Year: 1996).*
(Continued)

*Primary Examiner* — Jeffrey A Vonch
(74) *Attorney, Agent, or Firm* — Cheng Law Group, PLLC

(57) ABSTRACT

There is provided an interlayer film for laminated glass with which double images in laminated glass can be considerably suppressed. The interlayer film for laminated glass according to the present invention has one end and the other end being at the opposite side of the one end, makes the thickness of the other end larger than the thickness of the one end, has a display corresponding region corresponding to a display area of the head-up display, and when a position apart from an end part at the one end side of the display corresponding region by 4 cm toward the other end is set to a start point, a position apart from an end part at the other end side of the display corresponding region by 4 cm toward the one end is set to an end point, spots are selected at 2-mm intervals from the start point to the end point, and the interlayer film is measured for the amount of change in the thickness within respective segments, centered on the respective spots, of 80 mm in a direction connecting the one end and the other end, makes the absolute value of a difference between the largest value among values of the (Continued)

amount of change in the thickness and the smallest value among values of the amount of change in the thickness 32 μm or less.

10 Claims, 3 Drawing Sheets

(51) Int. Cl.
  *B32B 27/22* (2006.01)
  *B32B 27/30* (2006.01)
  *G02B 27/01* (2006.01)
  *B32B 7/02* (2019.01)
  *B32B 7/12* (2006.01)
  *B32B 3/26* (2006.01)
  *B32B 3/02* (2006.01)
  *B60K 35/00* (2006.01)
  *B60J 1/02* (2006.01)
  *G02B 27/00* (2006.01)
  *B60J 1/00* (2006.01)

(52) U.S. Cl.
  CPC .. *B32B 17/10541* (2013.01); *B32B 17/10761* (2013.01); *B32B 27/08* (2013.01); *B32B 27/22* (2013.01); *B32B 27/306* (2013.01); *B32B 27/308* (2013.01); *B60J 1/001* (2013.01); *B60J 1/02* (2013.01); *B60K 35/00* (2013.01); *G02B 27/0018* (2013.01); *G02B 27/01* (2013.01); *B32B 3/02* (2013.01); *B32B 7/02* (2013.01); *B32B 7/12* (2013.01); *B32B 2250/03* (2013.01); *B32B 2250/05* (2013.01); *B32B 2250/40* (2013.01); *B32B 2307/102* (2013.01); *B32B 2307/732* (2013.01); *B32B 2309/105* (2013.01); *B32B 2315/08* (2013.01); *B32B 2329/00* (2013.01); *B32B 2329/06* (2013.01); *B32B 2605/006* (2013.01); *G02B 2027/012* (2013.01); *Y10T 428/24479* (2015.01); *Y10T 428/24612* (2015.01); *Y10T 428/24942* (2015.01)

(56) References Cited

U.S. PATENT DOCUMENTS

| | | | | |
|---|---|---|---|---|
| 5,087,502 A * | 2/1992 | Esposito | ............... | B26F 1/3813 428/156 |
| 5,130,174 A * | 7/1992 | Esposito | ........... | B32B 17/10339 428/156 |
| 5,137,673 A * | 8/1992 | Bourcier | ............... | B26F 1/3813 264/151 |
| 5,425,977 A * | 6/1995 | Hopfe | ................... | B29C 59/022 428/141 |
| 5,639,538 A * | 6/1997 | Wong | ................ | B32B 17/10568 428/156 |
| 5,812,332 A * | 9/1998 | Freeman | ................... | B32B 3/02 359/894 |
| 5,945,199 A * | 8/1999 | Morin | ............... | B32B 17/10018 345/7 |
| 6,093,471 A * | 7/2000 | Hopfe | ............... | B32B 17/10577 428/141 |
| 2001/0044010 A1* | 11/2001 | Freeman | ................... | B32B 3/02 428/157 |
| 2002/0172804 A1* | 11/2002 | Sauer | ..................... | B32B 17/10 428/172 |
| 2003/0215610 A1* | 11/2003 | DiGiampaolo | ... | B32B 17/10036 428/156 |
| 2004/0053006 A1* | 3/2004 | Omizu | ............... | B32B 17/10036 428/156 |
| 2004/0166288 A1* | 8/2004 | Travis | ....................... | B32B 3/00 428/156 |
| 2004/0191482 A1* | 9/2004 | Nakajima | ............. | B29C 59/022 428/156 |
| 2006/0188695 A1* | 8/2006 | Yacovone | ............... | B32B 17/10 428/141 |
| 2006/0210776 A1* | 9/2006 | Lu | ........................... | B32B 17/10 428/192 |
| 2006/0228529 A1* | 10/2006 | Liposcak | .................. | B32B 3/18 428/189 |
| 2007/0009714 A1* | 1/2007 | Lee | ................... | B32B 17/10568 428/172 |
| 2007/0148419 A1* | 6/2007 | Wiedemann | ...... | B32B 17/10036 428/198 |
| 2007/0148472 A1* | 6/2007 | Masaki | ............. | B32B 17/10036 428/426 |
| 2007/0231550 A1* | 10/2007 | Stenzel | ................... | B29C 59/04 428/172 |
| 2008/0102280 A1* | 5/2008 | Lu | ...................... | B32B 17/10339 428/411.1 |
| 2008/0157426 A1* | 7/2008 | Kotwis | .................. | B29C 48/919 264/211.12 |
| 2008/0176043 A1* | 7/2008 | Masaki | ............. | B32B 17/10036 428/172 |
| 2008/0268204 A1* | 10/2008 | Bourcier | ........... | B32B 17/10587 428/147 |
| 2009/0294212 A1* | 12/2009 | Miyai | ............... | B32B 17/10568 181/289 |
| 2010/0086744 A1* | 4/2010 | Stenzel | ............... | B29C 45/0001 428/174 |
| 2010/0314900 A1* | 12/2010 | Labrot | .............. | B32B 17/10036 296/90 |
| 2011/0094825 A1 | 4/2011 | Miyai | | |
| 2011/0189426 A1* | 8/2011 | Durbin | ................. | B29C 55/045 428/80 |
| 2012/0003428 A1 | 1/2012 | Miyai | | |
| 2012/0135191 A1* | 5/2012 | Spangler | ................. | B29C 59/04 428/141 |
| 2013/0004719 A1* | 1/2013 | Thellier | ............ | B32B 17/10036 428/157 |
| 2013/0149503 A1* | 6/2013 | Yamamoto | ........ | B32B 17/10568 428/172 |
| 2013/0236711 A1* | 9/2013 | Lu | ........................... | B32B 27/30 428/213 |
| 2013/0316158 A1* | 11/2013 | Rehfeld | ............ | B32B 17/10761 428/215 |
| 2014/0020759 A1* | 1/2014 | Oda | ..................... | H01L 31/0481 136/259 |
| 2014/0178651 A1 | 6/2014 | Miyai | | |
| 2014/0224423 A1* | 8/2014 | Keller | ............... | B32B 17/10036 156/313 |
| 2014/0302281 A1* | 10/2014 | Yacovone | ................ | C08F 116/06 428/141 |
| 2015/0217547 A1* | 8/2015 | Greb | .................. | B32B 37/0038 156/308.6 |
| 2015/0251377 A1* | 9/2015 | Cleary | .................... | B32B 3/263 428/172 |
| 2015/0258747 A1 | 9/2015 | Miyai | | |
| 2015/0362727 A1* | 12/2015 | Hervy | ................ | G02B 27/0101 359/630 |
| 2016/0096349 A1* | 4/2016 | Lu | ........................ | B32B 27/365 428/217 |
| 2016/0151995 A1* | 6/2016 | Kitano | ...................... | B32B 7/06 428/186 |
| 2016/0159041 A1* | 6/2016 | Lu | ..................... | B32B 17/10568 428/162 |
| 2016/0168353 A1* | 6/2016 | Spangler | .................. | C08K 5/103 428/172 |
| 2016/0257095 A1* | 9/2016 | Cleary | .................. | G02B 27/01 |
| 2016/0291324 A1* | 10/2016 | Arndt | ............... | B32B 17/10036 |
| 2016/0318278 A1* | 11/2016 | Nakayama | ........ | B60J 1/02 |
| 2016/0341960 A1 | 11/2016 | Miyai | | |
| 2017/0003503 A1* | 1/2017 | Arndt | ............... | B32B 17/10036 |
| 2017/0015082 A1* | 1/2017 | Creytens | .................. | B32B 3/30 |
| 2017/0136742 A1* | 5/2017 | Oota | ........................ | B32B 7/04 |
| 2017/0165938 A1* | 6/2017 | Hirota | ............... | B32B 17/10577 |
| 2017/0197386 A1* | 7/2017 | Oota | ....................... | B32B 27/18 |

(56) References Cited

U.S. PATENT DOCUMENTS

| | | | | |
|---|---|---|---|---|
| 2017/0232713 A1* | 8/2017 | Mannheim Astete | ........................ B32B 17/10284 | |
| | | | | 428/172 |
| 2017/0274631 A1* | 9/2017 | Oota | ........................ B32B 27/18 | |
| 2017/0313032 A1* | 11/2017 | Arndt | ................ B32B 17/10036 | |
| 2018/0297332 A1* | 10/2018 | Nishino | ............ B32B 17/10036 | |

FOREIGN PATENT DOCUMENTS

| | | | | |
|---|---|---|---|---|
| DE | 19951444 A1 * | 4/2001 | ....... B32B 17/10596 | |
| DE | 10112935 A1 * | 10/2002 | .............. B60J 1/008 | |
| DE | 102013012648 A1 * | 3/2014 | | |
| EP | 1 063 205 A1 | 12/2000 | | |
| EP | 2 612 843 A1 | 7/2013 | | |
| EP | 2883693 A1 * | 6/2015 | | |
| JP | 4-502525 A | 5/1992 | | |
| JP | 08143345 A * | 6/1996 | | |
| JP | 09295839 A * | 11/1997 | ....... B32B 17/10587 | |
| JP | 2000187181 A * | 7/2000 | ................ B32B 5/14 | |
| JP | 2000290046 A * | 10/2000 | ....... B32B 17/10587 | |
| JP | 2000319046 A * | 11/2000 | ....... B32B 17/10587 | |
| JP | 2001192243 A * | 7/2001 | | |
| JP | 2001220184 A * | 8/2001 | | |
| JP | 2003128442 A * | 5/2003 | | |
| JP | 2003252659 A * | 9/2003 | | |
| JP | 2005-68006 A | 3/2005 | | |
| JP | 2008018910 A * | 1/2008 | | |
| JP | 2009-35444 A | 2/2009 | | |
| JP | 2009035444 A * | 2/2009 | ....... B32B 17/10036 | |
| JP | 2011-505330 A | 2/2011 | | |
| JP | 2011088785 A * | 5/2011 | ....... B32B 17/10761 | |
| JP | 2011088801 A * | 5/2011 | ....... B32B 17/10568 | |
| JP | 2011207645 A * | 10/2011 | ....... B32B 17/10568 | |
| JP | 2012-106932 A | 6/2012 | | |
| JP | 2013001595 A * | 1/2013 | | |
| JP | 2013006730 A * | 1/2013 | | |
| JP | 2013006731 A * | 1/2013 | | |
| JP | 2013-91793 A | 5/2013 | | |
| WO | WO-91/06031 A1 | 5/1991 | | |
| WO | WO-9946213 A1 * | 9/1999 | ................ B32B 5/14 | |
| WO | WO-2005005123 A1 * | 1/2005 | ............ B29C 43/222 | |
| WO | WO-2007/132777 A1 | 11/2007 | | |
| WO | WO-2015/086233 A1 | 6/2015 | | |

OTHER PUBLICATIONS

Machine Translation of JP 2009035444 A, Feb. 2009 (Year: 2009).*
Supplementary European Search Report for the Application No. EP 16 851 505.4 dated Apr. 2, 2019.
International Search Report for the Application No. PCT/JP2016/078400 dated Nov. 1, 2016.
Written Opinion of the International Searching Authority (PCT/ISA/237) for Application No. PCT/JP2016/078400 dated Nov. 1, 2016.
Written Opinion of the International Searching Authority (PCT/ISA/237) for Application No. PCT/JP2016/078400 dated Nov. 1, 2016 (English Translation dated Apr. 12, 2018).

* cited by examiner

[FIG. 1]
(a)
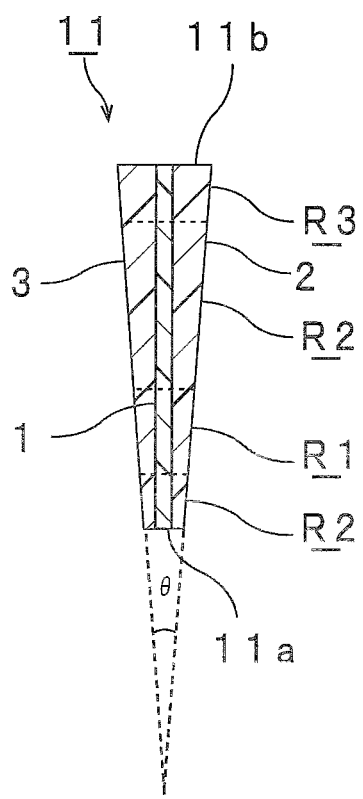
(b)
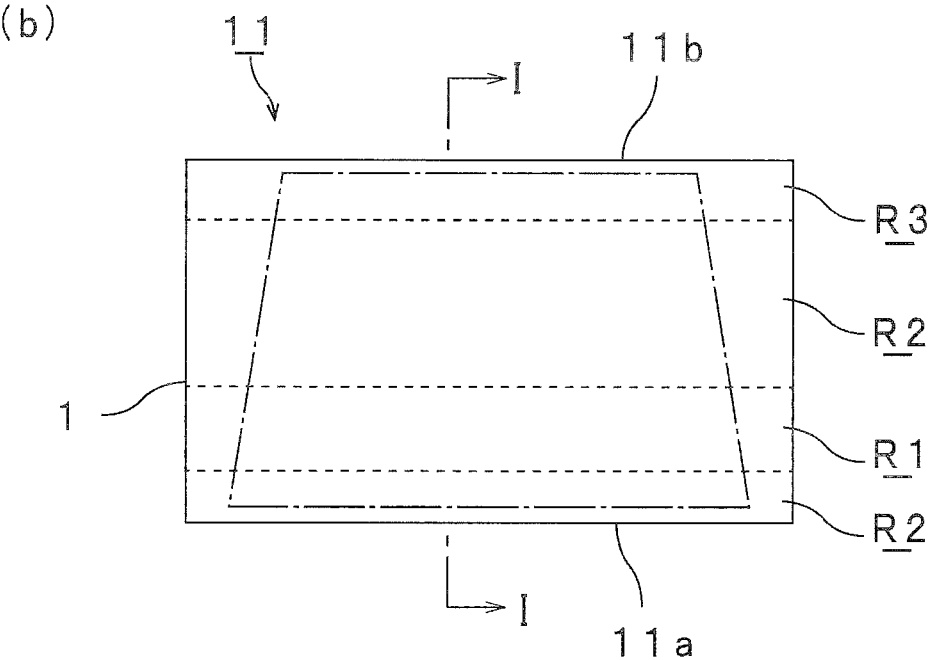

[FIG. 2]
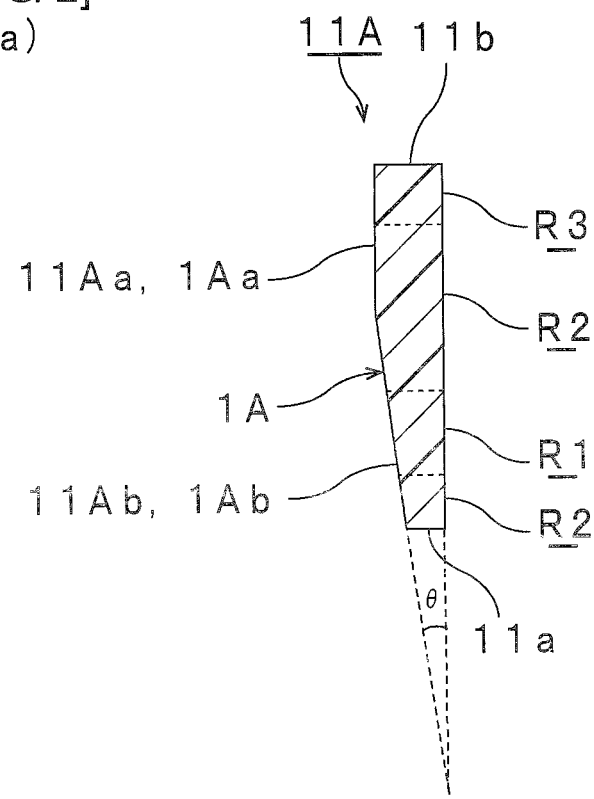
(a)
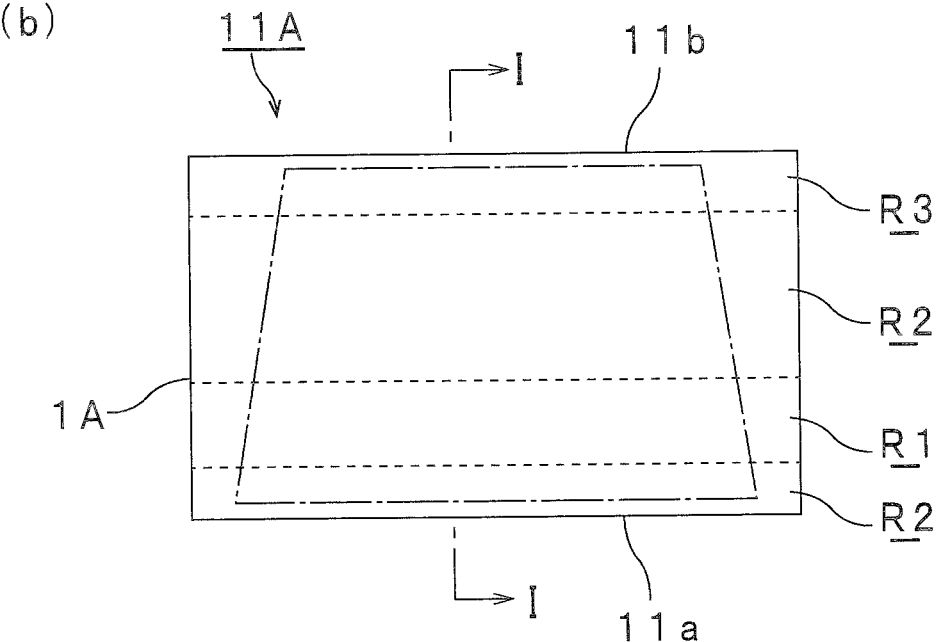
(b)

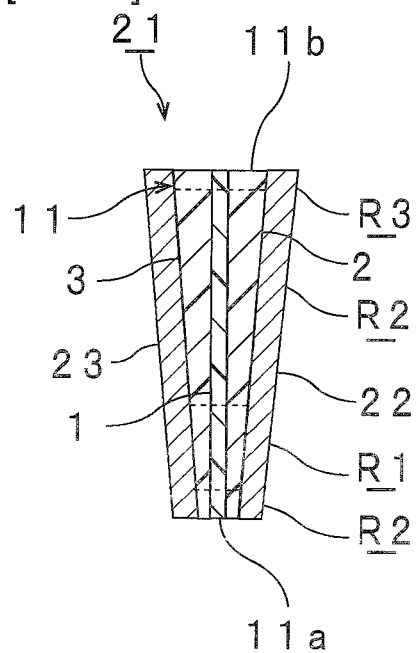
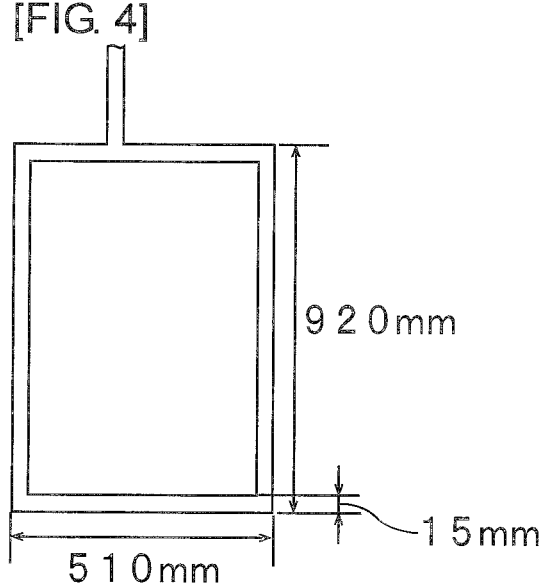

INTERLAYER FOR LAMINATED GLASS AND LAMINATED GLASS

TECHNICAL FIELD

The present invention relates to an interlayer film for laminated glass which is used for obtaining laminated glass. Moreover, the present invention relates to laminated glass prepared with the interlayer film for laminated glass.

BACKGROUND ART

Since laminated glass generally generates only a small amount of scattering glass fragments even when subjected to external impact and broken, laminated glass is excellent in safety. As such, the laminated glass is widely used for automobiles, railway vehicles, aircraft, ships, buildings, and the like. The laminated glass is produced by sandwiching an interlayer film for laminated glass between a pair of glass plates.

Moreover, as the laminated glass used for automobiles, a head-up display (HUD) has been known. In the HUD, on the windshield of an automobile, measured information such as the speed which is traveling data of the automobile and the like can be displayed.

In the HUD, there is a problem that the measured information displayed on the windshield is doubly observed.

In order to suppress double images, a wedge-shaped interlayer film has been used. The following Patent Document 1 discloses a sheet of laminated glass in which a wedge-shaped interlayer film having a prescribed wedge angle is sandwiched between a pair of glass plates. In such a sheet of laminated glass, by the adjustment of the wedge angle of the interlayer film, a display of measured information reflected by one glass plate and a display of measured information reflected by the other glass plate can be focused into one point to make an image in the visual field of a driver. As such, the display of measured information is hard to be observed doubly and the visibility of a driver is hard to be hindered.

RELATED ART DOCUMENT

Patent Document

Patent Document 1: JP H4-502525 T

SUMMARY OF THE INVENTION

Problems to be Solved by the Invention

Even with a conventional interlayer film, it is difficult to sufficiently suppress double images. As a result of researches by the present inventor, it has been found out that double images fail to be sufficiently suppressed only by simply controlling the wedge angle.

An object of the present invention is to provide an interlayer film for laminated glass with which double images in laminated glass can be considerably suppressed. Moreover, the present invention is also aimed at providing laminated glass prepared with the above-mentioned interlayer film for laminated glass.

Means for Solving the Problems

According to a broad aspect of the present invention, there is provided an interlayer film for laminated glass (in the present specification, "an interlayer film for laminated glass" is sometimes abbreviated as "an interlayer film") being used for laminated glass constituting a head-up display, having one end and the other end being at the opposite side of the one end, making the thickness of the other end larger than the thickness of the one end, and having a display corresponding region corresponding to a display area of the head-up display, when a position apart from an end part at the one end side of the display corresponding region by 4 cm toward the other end is set to a start point, a position apart from an end part at the other end side of the display corresponding region by 4 cm toward the one end is set to an end point, spots are selected at 2-mm intervals from the start point to the end point, and the interlayer film is measured for the amount of change in the thickness within respective segments, centered on the respective spots, of 80 mm in a direction connecting the one end and the other end, the absolute value of a difference between the largest value among values of the amount of change in the thickness and the smallest value among values of the amount of change in the thickness being 32 μm or less.

According to a broad aspect of the present invention, there is provided an interlayer film for laminated glass having one end and the other end being at the opposite side of the one end and making the thickness of the other end larger than the thickness of the one end, when 250 spots are selected at 2-mm intervals from a position apart from the one end of the interlayer film by 10 cm toward the other end and the interlayer film is measured for the amount of change in the thickness within respective 250 segments, centered on the respective 250 spots, of 80 mm in a direction connecting the one end and the other end, the absolute value of a difference between the largest value among 250 values of the amount of change in the thickness and the smallest value among 250 values of the amount of change in the thickness being 32 μm or less.

In a specific aspect of the interlayer film according to the present invention, the largest value among values of the amount of change in the thickness is 160 μm or less.

In a specific aspect of the interlayer film according to the present invention, the smallest value among values of the amount of change in the thickness is 8 μm or more.

It is preferred that the interlayer film contain a thermoplastic resin. It is preferred that the interlayer film contain a plasticizer.

In a specific aspect of the interlayer film according to the present invention, the interlayer film is provided with a first layer and a second layer arranged on a first surface side of the first layer.

In a specific aspect of the interlayer film according to the present invention, the first layer contains a polyvinyl acetal resin, the second layer contains a polyvinyl acetal resin, and the content of the hydroxyl group of the polyvinyl acetal resin in the first layer is lower than the content of the hydroxyl group of the polyvinyl acetal resin in the second layer.

In a specific aspect of the interlayer film according to the present invention, the first layer contains a polyvinyl acetal resin, the second layer contains a polyvinyl acetal resin, the first layer contains a plasticizer, the second layer contains a plasticizer, and the content of the plasticizer in the first layer relative to 100 parts by weight of the polyvinyl acetal resin in the first layer is larger than the content of the plasticizer in the second layer relative to 100 parts by weight of the polyvinyl acetal resin in the second layer.

In a specific aspect of the interlayer film according to the present invention, the interlayer film has a portion with a sectional shape in the thickness direction of a wedge-like shape within a segment extending from a position apart from the one end by 6 cm toward the other end to a position apart from the one end by 63.8 cm toward the other end.

According to a broad aspect of the present invention, there is provided laminated glass including a first lamination glass member, a second lamination glass member, and the above-described interlayer film for laminated glass, the interlayer film for laminated glass being arranged between the first lamination glass member and the second lamination glass member.

Effect of the Invention

Since the interlayer film for laminated glass according to the present invention is an interlayer film for laminated glass being used for laminated glass constituting a head-up display and is an interlayer film for laminated glass having one end and the other end being at the opposite side of the one end, making the thickness of the other end larger than the thickness of the one end, having a display corresponding region corresponding to a display area of the head-up display, and when a position apart from an end part at the one end side of the display corresponding region by 4 cm toward the other end is set to a start point, a position apart from an end part at the other end side of the display corresponding region by 4 cm toward the one end is set to an end point, spots are selected at 2-mm intervals from the start point to the end point, and the interlayer film is measured for the amount of change in the thickness within respective segments, centered on the respective spots, of 80 mm in a direction connecting the one end and the other end, making the absolute value of a difference between the largest value among values of the amount of change in the thickness and the smallest value among values of the amount of change in the thickness 32 μm or less, double images in laminated glass can be considerably suppressed.

Moreover, since the interlayer film for laminated glass according to the present invention has one end and the other end being at the opposite side of the one end, makes the thickness of the other end larger than the thickness of the one end, and when 250 spots are selected at 2-mm intervals from a position apart from the one end of the interlayer film by 10 cm toward the other end and the interlayer film is measured for the amount of change in the thickness within respective 250 segments, centered on the respective 250 spots, of 80 mm in a direction connecting the one end and the other end, makes the absolute value of a difference between the largest value among 250 values of the amount of change in the thickness and the smallest value among 250 values of the amount of change in the thickness 32 μm or less, double images in laminated glass can be considerably suppressed.

BRIEF DESCRIPTION OF DRAWINGS

FIGS. 1(a) and 1(b) are a sectional view and a front view schematically showing an interlayer film for laminated glass in accordance with a first embodiment of the present invention.

FIGS. 2(a) and 2(b) are a sectional view and a front view schematically showing an interlayer film for laminated glass in accordance with a second embodiment of the present invention.

FIG. 3 is a sectional view showing an example of laminated glass prepared with the interlayer film for laminated glass shown in FIG. 1.

FIG. 4 is a figure for explaining a preliminary pressing method used in evaluation of double images for examples.

MODE(S) FOR CARRYING OUT THE INVENTION

Hereinafter, the details of the present invention will be described.

The interlayer film for laminated glass (in the present specification, sometimes abbreviated as "the interlayer film") according to the present invention is used for laminated glass.

The interlayer film according to the present invention has a one-layer structure or a two or more-layer structure. The interlayer film according to the present invention may have a one-layer structure and may have a two or more-layer structure. The interlayer film according to the present invention may have a two-layer structure and may have a three or more-layer structure. The interlayer film according to the present invention may be a single-layered interlayer film and may be a multi-layered interlayer film.

The interlayer film according to the present invention has one end and the other end being at the opposite side of the one end. The one end and the other end are end parts of both sides facing each other in the interlayer film. In the interlayer film according to the present invention, the thickness of the other end is larger than the thickness of the one end.

For example, the interlayer film according to the present invention has a display corresponding region corresponding to a display area of a head-up display. The display corresponding region is a region on which information can be satisfactorily displayed.

In the interlayer film according to the present invention, a position apart from an end part at the one end side of the display corresponding region by 4 cm toward the other end is set to a start point, a position apart from an end part at the other end side of the display corresponding region by 4 cm toward the one end is set to an end point, and spots are selected at 2-mm intervals from the start point to the end point. On this occasion, selection of the spot is started from an end part at the one end side and a spot is selected until no more spot can be positioned at a 2-mm interval from the one end side toward the other end side. Each of segments, centered on each of the selected spots, of 80 mm in a direction connecting the one end and the other end is defined as each segment (X). A segment (X) nearest to the one end side of the interlayer film is a segment (X) extending between positions apart from an end part at the one end side of the display corresponding region by 0 cm to 8 cm toward the other end and a subsequent segment (X) is a segment (X) extending between positions apart from an end part at the one end side of the display corresponding region by 0.2 cm to 8.2 cm toward the other end. A spot is selected until no more segment (X) can be positioned. Two segments (X) adjacent to each other are overlapped with each other by 78 mm in a direction connecting the one end and the other end.

In each of the respective segments (X), the interlayer film is measured for the amount of change in the thickness (the amount of change in the thickness measured in each of the segments (X) is defined as the amount (X) of change in the thickness). This amount (X) of change in the thickness refers to the absolute value of a difference between the largest value of the thickness and the smallest value thereof in each of the segments (X).

In the interlayer film according to the present invention, the absolute value of a difference between the largest value among values of the amount (X) of change in the thickness and the smallest value among values of the amount (X) of change in the thickness is 32 μm or less.

In the interlayer film according to the present invention, 250 spots are selected at 2-mm intervals from a position apart from the one end of the interlayer film by 10 cm toward the other end. Specifically, 250 spots are selected at 2-mm intervals from a position apart from the one end by 10 cm toward the other end to a position apart from the one end by 59.8 cm toward the other end. Each of 250 segments, centered on each of the 250 spots selected, of 80 mm in a direction connecting the one end and the other end is defined as each segment (X1). A segment (X1) nearest to the one end side of the interlayer film is a segment extending between positions apart from the one end by 6 cm to 14 cm and a subsequent segment (X1) is a segment extending between positions apart from the one end by 6.2 cm to 14.2 cm. A segment (X1) farthest from the one end side of the interlayer film is a segment extending between positions apart from the one end by 55.8 cm to 63.8 cm. Two segments (X1) adjacent to each other are overlapped with each other by 78 mm in a direction connecting the one end and the other end. Each of the 250 segments (X1) is each of segments (X1) extending between positions apart from the one end by (6+0.2×A) cm to (14+0.2×A) cm (A represents an integer of 0 to 249).

In each of the respective 250 segments (X1), the interlayer film is measured for the amount of change in the thickness (the amount of change in the thickness measured in each of the 250 segments (X1) is defined as the amount (X1) of change in the thickness). This amount (X1) of change in the thickness refers to the absolute value of a difference between the largest value of the thickness and the smallest value thereof in each of the 250 segments (X1).

In the interlayer film according to the present invention, the absolute value of a difference between the largest value among 250 values of the amount (X1) of change in the thickness and the smallest value among 250 values of the amount (X1) of change in the thickness is 32 μm or less.

Since the interlayer film according to the present invention is provided with the above-mentioned configuration, double images in laminated glass can be considerably suppressed. In the present invention, when information to be displayed, which is emitted from a display unit, is reflected in a sheet of laminated glass, the occurrence of double images is considerably suppressed.

From the viewpoint of effectively suppressing double images, the largest value among all values of the amount (X) of change in the thickness measured in the segment (X) is preferably 160 μm or less, more preferably 140 μm or less, and further preferably 120 μm or less. From the viewpoint of effectively suppressing double images, the largest value among 250 values of the amount (X1) of change in the thickness measured in the segment (X1) is preferably 160 μm or less, more preferably 140 μm or less, and further preferably 120 μm or less.

From the viewpoint of effectively suppressing double images, the smallest value among all values of the amount (X1) of change in the thickness measured in the segment (X) (the smallest value of the amount of change in the thickness) is preferably 8 μm or more, more preferably 16 μm or more, and further preferably 24 μm or more. From the viewpoint of effectively suppressing double images, the smallest value among 250 values of the amount (X1) of change in the thickness measured in the segment (X1) (the smallest value of the amount of change in the thickness) is preferably 8 μm or more, more preferably 16 μm or more, and further preferably 24 μm or more.

From the viewpoint of effectively suppressing double images, the absolute value of a difference between the largest value among all values of the amount (X) of change in the thickness and the smallest value among all values of the amount (X) of change in the thickness is preferably 1.6 μm or more. From the viewpoint of effectively suppressing double images, the absolute value of a difference between the largest value among 250 values of the amount (X1) of change in the thickness and the smallest value among 250 values of the amount (X1) of change in the thickness is preferably 1.6 μm or more.

From the viewpoint of further effectively suppressing double images, it is preferred that, within 80% or more (more preferably 85% or more, further preferably 90% or more, and especially preferably 95% or more) of the segment extending from a position apart from the one end by 6 cm toward the other end to a position apart from the one end by 63.8 cm toward the other end, the thickness be increased in a direction from the one end to the other end. It is preferred that, within 80% or more (more preferably 85% or more, further preferably 90% or more, and especially preferably 95% or more) of the segment extending from a position apart from the one end by 10 cm toward the other end to a position apart from the one end by 59.8 cm toward the other end, the thickness be increased in a direction from the one end to the other end.

The interlayer film according to the present invention is suitably used for laminated glass constituting a head-up display (HUD). It is preferred that the interlayer film according to the present invention be an interlayer film for HUD.

It is preferred that the interlayer film according to the present invention have a display corresponding region corresponding to a display area of HUD. From the viewpoint of further effectively suppressing double images, it is preferred that, within a segment extending from a position apart from the one end by 6 cm toward the other end to a position apart from the one end by 63.8 cm toward the other end, the interlayer film according to the present invention have the display corresponding region. It is more preferred that, within a segment extending from a position apart from the one end by 10 cm toward the other end to a position apart from the one end by 59.8 cm toward the other end, the interlayer film according to the present invention have the display corresponding region.

From the viewpoint of effectively suppressing double images, it is preferred that, within a segment extending from a position apart from the one end by 6 cm toward the other end to a position apart from the one end by 63.8 cm toward the other end, the interlayer film have a portion with a sectional shape in the thickness direction of a wedge-like shape. It is more preferred that, within a segment extending from a position apart from the one end by 10 cm toward the other end to a position apart from the one end by 59.8 cm toward the other end, the interlayer film has a portion with a sectional shape in the thickness direction of a wedge-like shape.

The interlayer film according to the present invention may have a shade region. The shade region may be apart from the display corresponding region. For example, the shade region is provided for the purposes of preventing a driver during the driving from feeling glare due to the rays of the sun, the exterior illumination, or the like. The shade region is also sometimes provided for imparting the heat shielding properties. It is preferred that the shade region be positioned in an edge part of the interlayer film. It is preferred that the shade region have a band-like shape.

In the shade region, for the purposes of changing the color and visible light transmittance and the like, a coloring agent or a filling agent may be used. The coloring agent or the filling agent may be contained only in a partial region in the thickness direction of the interlayer film and may be contained in the whole region in the thickness direction of the interlayer film.

From the viewpoints of further improving the display quality and further widening the visual field, the visible light transmittance of the display corresponding region is preferably 80% or more, more preferably 88% or more, and further preferably 90% or more. It is preferred that the visible light transmittance of the display corresponding region be higher than the visible light transmittance of the shade region. The visible light transmittance of the display corresponding region may be lower than the visible light transmittance of the shade region. The visible light transmittance of the display corresponding region is preferably higher by 50% or more, more preferably higher by 60% or more, than the visible light transmittance of the shade region.

In this connection, for example, when the visible light transmittance varies with places within the display corresponding region or the shade region of the interlayer film, the center position of the display corresponding region or the center position of the shade region is measured for the visible light transmittance.

The obtained laminated glass can be measured for the visible light transmittance within a wavelength range of 380 to 780 nm in accordance with JIS R3211 (1998) with the use of a spectrophotometer ("U-4100" available from Hitachi High-Technologies Corporation). In this connection, it is preferred that a sheet of clear glass with a thickness of 2 mm be used as the glass plate.

It is preferred that the display corresponding region have a length direction and a width direction. It is preferred that the width direction of the display corresponding region correspond to a direction connecting the one end and the other end, because the interlayer film is excellent in versatility. It is preferred that the display corresponding region have a band-like shape.

It is preferred that the interlayer film have an MD direction and a TD direction. For example, the interlayer film is obtained by melt extrusion molding. The MD direction is a flow direction of an interlayer film at the time of producing the interlayer film. The TD direction is a direction orthogonal to the flow direction of an interlayer film at the time of producing the interlayer film and a direction orthogonal to the thickness direction of the interlayer film. It is preferred that the one end and the other end be positioned at both sides in the TD direction, respectively.

From the viewpoint of further improving the display quality, it is preferred that the interlayer film have a portion with a sectional shape in the thickness direction of a wedge-like shape. It is preferred that the sectional shape in the thickness direction of the display corresponding region be a wedge-like shape.

Hereinafter, specific embodiments of the present invention will be described with reference to the drawings.

FIGS. 1(a) and 1(b) show an interlayer film for laminated glass in accordance with a first embodiment of the present invention schematically represented as a sectional view and a front view. FIG. 1(a) is a sectional view taken along the line I-I in FIG. 1(b). In this connection, for convenience of illustration, the size and dimensions of interlayer films in FIGS. 1(a) and 1(b) and a figure described below are appropriately modified from the actual size and shape.

In FIG. 1(a), a section in the thickness direction of an interlayer film 11 is shown. In this connection, in FIG. 1(a) and a figure described below, for convenience of illustration, the thicknesses of an interlayer film and respective layers constituting the interlayer film and the wedge angle θ are shown so as to be different from actual thicknesses thereof and an actual wedge angle.

The interlayer film 11 is provided with a first layer (intermediate layer), a second layer 2 (surface layer), and a third layer 3 (surface layer). The second layer 2 is arranged on a first surface side of the first layer 1 to be layered thereon. The third layer 3 is arranged on a second surface side opposite to the first surface of the first layer 1 to be layered thereon. The first layer 1 is arranged between the second layer 2 and the third layer 3 to be sandwiched therebetween. The interlayer film 11 is used for obtaining laminated glass. The interlayer film 11 is an interlayer film for laminated glass. The interlayer film 11 is a multilayer interlayer film.

The interlayer film 11 has one end 11a and the other end 11b at the opposite side of the one end 11a. The one end 11a and the other end 11b are end parts of both sides facing each other. The sectional shape in the thickness direction of each of the second layer 2 and the third layer is a wedge-like shape. The sectional shape in the thickness direction of the first layer 1 is a rectangular shape. The thickness of the other end 11b side of each of the second layer 2 and the third layer 3 is larger than that of the one end 11a side thereof. Accordingly, the thickness of the other end 11b of the interlayer film 11 is larger than the thickness of the one end 11a thereof. Accordingly, the interlayer film 11 has a region being thin in thickness and a region being thick in thickness.

The interlayer film 11 has a display corresponding region R1 corresponding to a display area of a head-up display. The interlayer film 11 has a peripheral region R2 adjacent to the display corresponding region R1. In the present embodiment, a segment extending from a position apart from the one end 11a by 6 cm toward the other end 11b to a position apart from the one end 11a by 63.8 cm toward the other end 11b corresponds to the display corresponding region R1.

The interlayer film 11 has a shade region R3 apart from the display corresponding region R1. The shade region R3 is positioned in an edge part of the interlayer film 11.

FIGS. 2(a) and 2(b) show an interlayer film for laminated glass in accordance with a second embodiment of the present invention schematically represented as a sectional view and a front view. FIG. 2(a) is a sectional view taken along the line I-I in FIG. 2(b). In FIG. 2(a), a section in the thickness direction of an interlayer film 11A is shown.

The interlayer film 11A shown in FIG. 2 is provided with a first layer 1A. The interlayer film 11A has a one-layer structure composed only of the first layer 1A and is a single-layered interlayer film. The interlayer film 11A is singly constituted by the first layer 1A. The interlayer film 11A is used for obtaining laminated glass. The interlayer film 11A is an interlayer film for laminated glass.

The interlayer film 11A has one end 11a and the other end 11b at the opposite side of the one end 11a. The one end 11a and the other end 11b are end parts of both sides facing each other. The thickness of the other end lib of the interlayer film 11A is larger than the thickness of the one end 11a thereof. Accordingly, the first layer 1A corresponding to the interlayer film 11A has a region being thin in thickness and a region being thick in thickness.

The interlayer film 11A and the first layer 1A each have a portion 11Aa, 1Aa with a sectional shape in the thickness direction of a rectangular shape and a portion 11Ab, 1Ab with a sectional shape in the thickness direction of a wedge-like shape.

The interlayer film 11A has a display corresponding region R1 corresponding to a display area of a head-up display. The interlayer film 11A has a peripheral region R2 adjacent to the display corresponding region R1.

The interlayer film 11A has a shade region R3 apart from the display corresponding region R1. The shade region R3 is positioned in an edge part of the interlayer film 11A.

It is preferred that the interlayer film have a portion with a sectional shape in the thickness direction of a wedge-like shape. It is preferred that the interlayer film have a portion where the thickness is gradually increased from one end toward the other end. It is preferred that the sectional shape in the thickness direction of the interlayer film be a wedge-like shape. Examples of the sectional shape in the thickness direction of the interlayer film include a trapezoidal shape, a triangular shape, a pentagonal shape, and the like.

In order to suppress double images, the wedge angle θ of the interlayer film can be appropriately set according to the fitting angle of laminated glass. From the viewpoint of further suppressing double images, the wedge angle θ of the interlayer film is preferably 0.01 mrad (0.0006 degrees) or more, more preferably 0.2 mrad (0.0115 degrees) or more, and preferably 2 mrad (0.1146 degrees) or less, and more preferably 0.7 mrad (0.0401 degrees) or less. The wedge angle θ of an interlayer film is an interior angle formed at the intersection point between a straight line connecting a point on the first surface of the maximum thickness part of the interlayer film and a point on the first surface of the minimum thickness part thereof and a straight line connecting a point on the second surface of the maximum thickness part of the interlayer film and a point on the second surface of the minimum thickness part thereof.

From the viewpoint of further suppressing double images, the wedge angle θ formed by each of the segment (X) and the segment (X1) is preferably 0.01 mrad (0.0006 degrees) or more, more preferably 0.2 mrad (0.0115 degrees) or more, and preferably 2 mrad (0.1146 degrees) or less, and more preferably 0.7 mrad (0.0401 degrees) or less.

The wedge angle θ formed by each of the segment (X) and the segment (X1) is an interior angle formed at the intersection point between a straight line connecting a point on the first surface of the maximum thickness part of the segment (X) or the segment (X1) in the interlayer film and a point on the first surface of the minimum thickness part thereof and a straight line connecting a point on the second surface of the maximum thickness part of the segment (X) or the segment (X1) in the interlayer film and a point on the second surface of the minimum thickness part thereof.

The thickness of the interlayer film is not particularly limited. The thickness of the interlayer film refers to the total thickness of the respective layers constituting the interlayer film. Thus, in the case of a multi-layered interlayer film 11, the thickness of the interlayer film refers to the total thickness of the first layer 1, the second layer 2, and the third layer 3.

The maximum thickness of the interlayer film is preferably 0.1 mm or more, more preferably 0.25 mm or more, further preferably 0.5 mm or more, especially preferably 0.8 mm or more, and preferably 3 mm or less, more preferably 2 mm or less, and further preferably 1.5 mm or less.

When the distance between one end and the other end is defined as X, it is preferred that the interlayer film have a minimum thickness in a region within a distance of 0X to 0.2X from the one end toward the inside and have a maximum thickness in a region within a distance of 0X to 0.2X from the other end toward the inside, and it is more preferred that the interlayer film have a minimum thickness in a region within a distance of 0X to 0.1X from the one end toward the inside and have a maximum thickness in a region within a distance of 0X to 0.1X from the other end toward the inside. It is preferred that the interlayer film have a minimum thickness at one end and the interlayer film have a maximum thickness at the other end.

The interlayer films 11 and 11A have a maximum thickness at the other end 11b and have a minimum thickness at the one end 11a.

From the viewpoint of the practical aspect and the viewpoint of sufficiently heightening the adhesive force and the penetration resistance, the maximum thickness of a surface layer is preferably 0.001 mm or more, more preferably 0.2 mm or more, further preferably 0.3 mm or more, and preferably 1 mm or less, and more preferably 0.8 mm or less.

From the viewpoint of the practical aspect and the viewpoint of sufficiently enhancing the penetration resistance, the maximum thickness of a layer (intermediate layer) arranged between two surface layers is 0.001 mm or more, more preferably 0.1 mm or more, further preferably 0.2 mm or more, and preferably 0.8 mm or less, more preferably 0.6 mm or less, and further preferably 0.3 mm or less.

The distance X between one end and the other end of the interlayer film is preferably 3 m or less, more preferably 2 m or less, especially preferably 1.5 m or less, and preferably 0.5 m or more, more preferably 0.8 m or more, and especially preferably 1 m or more.

Hereinafter, the details of materials constituting the respective layers of a multi-layered interlayer film and the single-layered interlayer film will be described.

(Thermoplastic Resin)

It is preferred that the interlayer film (the respective layers) contain a thermoplastic resin (hereinafter, sometimes described as a thermoplastic resin (0)) and it is preferred that the interlayer film (the respective layers) contain a polyvinyl acetal resin (hereinafter, sometimes described as a polyvinyl acetal resin (0)) as the thermoplastic resin (0). It is preferred that the first layer contain a thermoplastic resin (hereinafter, sometimes described as a thermoplastic resin (1)) and it is preferred that the first layer contain a polyvinyl acetal resin (hereinafter, sometimes described as a polyvinyl acetal resin (1)) as the thermoplastic resin (1). It is preferred that the second layer contain a thermoplastic resin (hereinafter, sometimes described as a thermoplastic resin (2)) and it is preferred that the second layer contain a polyvinyl acetal resin (hereinafter, sometimes described as a polyvinyl acetal resin (2)) as the thermoplastic resin (2). It is preferred that the third layer contain a thermoplastic resin (hereinafter, sometimes described as a thermoplastic resin (3)) and it is preferred that the third layer contain a polyvinyl acetal resin (hereinafter, sometimes described as a polyvinyl acetal resin (3)) as the thermoplastic resin (3). Although the thermoplastic resin (1), the thermoplastic resin (2), and the thermoplastic resin (3) may be the same as or different from one another, it is preferred that the thermoplastic resin (1) be different from the thermoplastic resin (2) and the thermoplastic resin (3) because the sound insulating properties are further heightened. Although the polyvinyl acetal resin (1), the polyvinyl acetal resin (2), and the polyvinyl acetal resin (3) may be the same as or different from one another, it is preferred that the polyvinyl acetal resin (1) be different from the polyvinyl acetal resin (2) and the polyvinyl acetal resin (3) because the sound insulating properties are further heightened. One kind of each of the thermoplastic resin (0), the thermoplastic resin (1), the thermoplastic resin (2), and the thermoplastic resin (3) may be used alone and two or more kinds thereof may be used in combination. One kind of each of the polyvinyl acetal resin (0), the polyvinyl acetal resin (1), the polyvinyl acetal resin (2), and the polyvinyl acetal resin (3) may be used alone and two or more kinds thereof may be used in combination.

Examples of the thermoplastic resin include a polyvinyl acetal resin, an ethylene-vinyl acetate copolymer resin, an ethylene-acrylic acid copolymer resin, a polyurethane resin, a polyvinyl alcohol resin, and the like. Thermoplastic resins other than these may be used.

It is preferred that the thermoplastic resin be a polyvinyl acetal resin. By using a polyvinyl acetal resin and a plasticizer together, the adhesive force of the interlayer film according to the present invention to a lamination glass member or another interlayer film is further heightened.

For example, the polyvinyl acetal resin can be produced by acetalizing polyvinyl alcohol (PVA) with an aldehyde. It is preferred that the polyvinyl acetal resin be an acetalized product of polyvinyl alcohol. For example, the polyvinyl alcohol can be obtained by saponifying polyvinyl acetate. The saponification degree of the polyvinyl alcohol generally lies within the range of 70 to 99.9% by mole.

The average polymerization degree of the polyvinyl alcohol (PVA) is preferably 200 or more, more preferably 500 or more, even more preferably 1500 or more, further preferably 1600 or more, especially preferably 2600 or more, most preferably 2700 or more, and preferably 5000 or less, more preferably 4000 or less and further preferably 3500 or less. When the average polymerization degree is the above lower limit or more, the penetration resistance of laminated glass is further enhanced. When the average polymerization degree is the above upper limit or less, formation of an interlayer film is facilitated.

The average polymerization degree of the polyvinyl alcohol is determined by a method in accordance with JIS K6726 "Testing methods for polyvinyl alcohol".

The number of carbon atoms of the acetal group contained in the polyvinyl acetal resin is not particularly limited. The aldehyde used at the time of producing the polyvinyl ii resin is not particularly limited. It is preferred that the number of carbon atoms of the acetal group in the polyvinyl acetal resin fall within the range of 3 to 5 and it is more preferred that the number of carbon atoms of the acetal group be 3 or 4. When the number of carbon atoms of the acetal group in the polyvinyl acetal resin is 3 or more, the glass transition temperature of the interlayer film is sufficiently lowered.

The aldehyde is not particularly limited. In general, an aldehyde with 1 to 10 carbon atoms is suitably used. Examples of the aldehyde with 1 to 10 carbon atoms include formaldehyde, acetaldehyde, propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, formaldehyde, acetaldehyde, benzaldehyde, and the like. Propionaldehyde, n-butyraldehyde, isobutyraldehyde, n-hexylaldehyde, or n-valeraldehyde is preferred, propionaldehyde, n-butyraldehyde, or isobutyraldehyde is more preferred, and n-butyraldehyde is further preferred. One kind of the aldehyde may be used alone and two or more kinds thereof may be used in combination.

The content of the hydroxyl group (the amount of hydroxyl groups) of the polyvinyl acetal resin (0) is preferably 15% by mole or more, more preferably 18% by mole or more, and preferably 40% by mole or less, and more preferably 35% by mole or less. When the content of the hydroxyl group is the above lower limit or more, the adhesive force of the interlayer film is further heightened. Moreover, when the content of the hydroxyl group is the above upper limit or less, the flexibility of the interlayer film is enhanced and the handling of the interlayer film is facilitated.

The content of the hydroxyl group (the amount of hydroxyl groups) of the polyvinyl acetal resin (1) is preferably 17% by mole or more, more preferably 20% by mole or more, further preferably 22% by mole or more, and preferably 28% by mole or less, more preferably 27% by mole or less, further preferably 25% by mole or less, and especially preferably 24% by mole or less. When the content of the hydroxyl group is the above lower limit or more, the mechanical strength of the interlayer film is further heightened. In particular, when the content of the hydroxyl group of the polyvinyl acetal resin (1) is 20% by mole or more, the resin is high in reaction efficiency and is excellent in productivity, and moreover, when being 28% by mole or less, the sound insulating properties of laminated glass are further heightened. Moreover, when the content of the hydroxyl group is the above upper limit or less, the flexibility of the interlayer film is enhanced and the handling of the interlayer film is facilitated.

The content of the hydroxyl group of each of the polyvinyl acetal resin (2) and the polyvinyl acetal resin (3) is preferably 25% by mole or more, more preferably 28% by mole or more, more preferably 30% by mole or more, even more preferably 31.5% by mole or more, further preferably 32% by mole or more, especially preferably 33% by mole or more, and preferably 38% by mole or less, more preferably 37% by mole or less, further preferably 36.5% by mole or less, and especially preferably 36% by mole or less. When the content of the hydroxyl group is the above lower limit or more, the adhesive force of the interlayer film is further heightened. Moreover, when the content of the hydroxyl group is the above upper limit or less, the flexibility of the interlayer film is enhanced and the handling of the interlayer film is facilitated.

From the viewpoint of further heightening the sound insulating properties, it is preferred that the content of the hydroxyl group of the polyvinyl acetal resin (1) be lower than the content of the hydroxyl group of the polyvinyl acetal resin (2). From the viewpoint of further heightening the sound insulating properties, it is preferred that the content of the hydroxyl group of the polyvinyl acetal resin (1) be lower than the content of the hydroxyl group of the polyvinyl acetal resin (3). From the viewpoint of still further heightening the sound insulating properties, the absolute value of a difference between the content of the hydroxyl group of the polyvinyl acetal resin (1) and the content of the hydroxyl group of the polyvinyl acetal resin (2) and the absolute value of a difference between the content of the hydroxyl group of the polyvinyl acetal resin (1) and the content of the hydroxyl group of the polyvinyl acetal resin (3) are preferably 1% by mole or more, more preferably 5% by mole or more, further preferably 9% by mole or more, especially preferably 10% by mole or more, and most preferably 12% by mole or more. The absolute value of a difference between the content of the hydroxyl group of the polyvinyl acetal resin (1) and the content of the hydroxyl group of the polyvinyl acetal resin (2) and the absolute value of a difference between the content of the hydroxyl group of the polyvinyl acetal resin (1) and the content of the hydroxyl group of the polyvinyl acetal resin (3) are preferably 20% by mole or less.

The content of the hydroxyl group of the polyvinyl acetal resin is a mole fraction, represented in percentage, obtained by dividing the amount of ethylene groups to which the hydroxyl group is bonded by the total amount of ethylene groups in the main chain. For example, the amount of ethylene groups to which the hydroxyl group is bonded can be measured in accordance with JIS K6728 "Testing methods for polyvinyl butyral".

The acetylation degree (the amount of acetyl groups) of the polyvinyl acetal resin (0) is preferably 0.1% by mole or more, more preferably 0.3% by mole or more, further preferably 0.5% by mole or more, and preferably 30% by mole or less, more preferably 25% by mole or less, and further preferably 20% by mole or less. When the acetylation degree is the above lower limit or more, the compatibility between the polyvinyl acetal resin and a plasticizer is heightened. When the acetylation degree is the above upper limit or less, with regard to the interlayer film and laminated glass, the moisture resistance thereof is enhanced.

The acetylation degree (the amount of acetyl groups) of the polyvinyl acetal resin (1) is preferably 0.01% by mole or more, more preferably 0.1% by mole or more, even more preferably 7% by mole or more, further preferably 9% by mole or more, and preferably 30% by mole or less, more preferably 25% by mole or less, further preferably 24% by mole or less, and especially preferably 20% by mole or less. When the acetylation degree is the above lower limit or more, the compatibility between the polyvinyl acetal resin and a plasticizer is heightened. When the acetylation degree is the above upper limit or less, with regard to the interlayer film and laminated glass, the moisture resistance thereof is enhanced. In particular, when the acetylation degree of the polyvinyl acetal resin (1) is 0.1% by mole or more and 25% by mole or less, the resulting laminated glass is excellent in penetration resistance.

The acetylation degree of each of the polyvinyl acetal resin (2) and the polyvinyl acetal resin (3) is preferably 0.01% by mole or more, more preferably 0.5% by mole or more, and preferably 10% by mole or less, and more preferably 2% by mole or less. When the acetylation degree is the above lower limit or more, the compatibility between the polyvinyl acetal resin and a plasticizer is heightened. When the acetylation degree is the above upper limit or less, with regard to the interlayer film and laminated glass, the moisture resistance thereof is enhanced.

The acetylation degree is a mole fraction, represented in percentage, obtained by dividing the amount of ethylene groups to which the acetyl group is bonded by the total amount of ethylene groups in the main chain. For example, the amount of ethylene groups to which the acetyl group is bonded can be measured in accordance with JIS K6728 "Testing methods for polyvinyl butyral".

The acetalization degree of the polyvinyl acetal resin (0) (the butyralization degree in the case of a polyvinyl butyral resin) is preferably 60% by mole or more, more preferably 63% by mole or more, and preferably 85% by mole or less, more preferably 75% by mole or less, and further preferably 70% by mole or less. When the acetalization degree is the above lower limit or more, the compatibility between the polyvinyl acetal resin and a plasticizer is heightened. When the acetalization degree is the above upper limit or less, the reaction time required for producing the polyvinyl acetal resin is shortened.

The acetalization degree of the polyvinyl acetal resin (1) (the butyralization degree in the case of a polyvinyl butyral resin) is preferably 47% by mole or more, more preferably 60% by mole or more, and preferably 85% by mole or less, more preferably 80% by mole or less, and further preferably 75% by mole or less. When the acetalization degree is the above lower limit or more, the compatibility between the polyvinyl acetal resin and a plasticizer is heightened. When the acetalization degree is the above upper limit or less, the reaction time required for producing the polyvinyl acetal resin is shortened.

The acetalization degree of each of the polyvinyl acetal resin (2) and the polyvinyl acetal resin (3) (the butyralization degree in the case of a polyvinyl butyral resin) is preferably 55% by mole or more, more preferably 60% by mole or more, and preferably 75% by mole or less, and more preferably 71% by mole or less. When the acetalization degree is the above lower limit or more, the compatibility between the polyvinyl acetal resin and a plasticizer is heightened. When the acetalization degree is the above upper limit or less, the reaction time required for producing the polyvinyl acetal resin is shortened.

The acetalization degree is a mole fraction, represented in percentage, obtained by dividing a value obtained by subtracting the amount of ethylene groups to which the hydroxyl group is bonded and the amount of ethylene groups to which the acetyl group is bonded from the total amount of ethylene groups in the main chain by the total amount of ethylene groups in the main chain.

In this connection, it is preferred that the content of the hydroxyl group (the amount of hydroxyl groups), the acetalization degree (the butyralization degree) and the acetylation degree be calculated from the results measured by a method in accordance with JIS K6728 "Testing methods for polyvinyl butyral". In this context, a method in accordance with ASTM D1396-92 may be used. When the polyvinyl acetal resin is a polyvinyl butyral resin, the content of the hydroxyl group (the amount of hydroxyl groups), the acetalization degree (the butyralization degree) and the acetylation degree can be calculated from the results measured by a method in accordance with JIS K6728 "Testing methods for polyvinyl butyral".

(Plasticizer)

From the viewpoint of further heightening the adhesive force of an interlayer film, it is preferred that the interlayer film according to the present invention contain a plasticizer. It is preferred that the first layer contain a plasticizer (hereinafter, sometimes described as a plasticizer (1)). It is preferred that the second layer contain a plasticizer (hereinafter, sometimes described as a plasticizer (2)). It is preferred that the third layer contain a plasticizer (hereinafter, sometimes described as a plasticizer (3)). When the thermoplastic resin contained in an interlayer film is a polyvinyl acetal resin, it is especially preferred that the interlayer film (the respective layers) contain a plasticizer. It is preferred that a layer containing a polyvinyl acetal resin contain a plasticizer.

The plasticizer is not particularly limited. As the plasticizer, a conventionally known plasticizer can be used. One kind of the plasticizer may be used alone and two or more kinds thereof may be used in combination.

Examples of the plasticizer include organic ester plasticizers such as a monobasic organic acid ester and a polybasic organic acid ester, organic phosphate plasticizers such as an organic phosphate plasticizer and an organic phosphite plasticizer, and the like. Organic ester plasticizers are preferred. It is preferred that the plasticizer be a liquid plasticizer.

Examples of the monobasic organic acid ester include a glycol ester obtained by the reaction of a glycol with a monobasic organic acid, and the like. Examples of the glycol include triethylene glycol, tetraethylene glycol, tripropylene glycol, and the like. Examples of the monobasic organic acid include butyric acid, isobutyric acid, caproic acid, 2-ethylbutyric acid, heptanoic acid, n-octylic acid, 2-ethylhexanoic acid, n-nonylic acid, decanoic acid, and the like.

Examples of the polybasic organic acid ester include an ester compound of a polybasic organic acid and an alcohol having a linear or branched structure of 4 to 8 carbon atoms. Examples of the polybasic organic acid include adipic acid, sebacic acid, azelaic acid, and the like.

Examples of the organic ester plasticizer include triethylene glycol di-2-ethylpropanoate, triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, dihexyl adipate, dioctyl adipate, hexyl cyclohexyl adipate, a mixture of heptyl adipate and nonyl adipate, diisononyl adipate, diisodecyl adipate, heptyl nonyl adipate, dibutyl sebacate, oil-modified sebacic alkyds, a mixture of a phosphoric acid ester and an adipic acid ester, and the like. Organic ester plasticizers other than these may be used. Other adipic acid esters other than the above-described adipic acid esters may be used.

Examples of the organic phosphate plasticizer include tributoxyethyl phosphate, isodecyl phenyl phosphate, triisopropyl phosphate, and the like.

It is preferred that the plasticizer be a diester plasticizer represented by the following formula (1).

[Chemical 1]

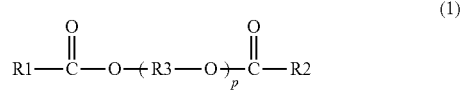
(1)

In the foregoing formula (1), R1 and R2 each represent an organic group with 5 to 10 carbon atoms, R3 represents an ethylene group, an isopropylene group, or an n-propylene group, and p represents an integer of 3 to 10. It is preferred that R1 and R2 in the foregoing formula (1) each be an organic group with 6 to 10 carbon atoms.

It is preferred that the plasticizer include triethylene glycol di-2-ethylhexanoate (3GO) or triethylene glycol di-2-ethylbutyrate (3GH) and it is more preferred that the plasticizer include triethylene glycol di-2-ethylhexanoate.

The content of the plasticizer (0) relative to 100 parts by weight of the thermoplastic resin (0) in the interlayer film is preferably 25 parts by weight or more, more preferably 30 parts by weight or more, and preferably 100 parts by weight or less, more preferably 60 parts by weight or less, and further preferably 50 parts by weight or less. When the content of the plasticizer (0) is the above lower limit or more, the penetration resistance of laminated glass is further enhanced. When the content of the plasticizer (0) is the above upper limit or less, the transparency of the interlayer film is further enhanced.

The content of the plasticizer (1) (hereinafter, sometimes described as the content (1)) relative to 100 parts by weight of the thermoplastic resin (1) is preferably 50 parts by weight or more, more preferably 55 parts by weight or more, further preferably 60 parts by weight or more, and preferably 100 parts by weight or less, more preferably 90 parts by weight or less, further preferably 85 parts by weight or less, and especially preferably 80 parts by weight or less. When the content (1) is the above lower limit or more, the flexibility of the interlayer film is enhanced and the handling of the interlayer film is facilitated. When the content (1) is the above upper limit or less, the penetration resistance of laminated glass is further enhanced.

Each of the content of the plasticizer (2) (hereinafter, sometimes described as the content (2)) relative to 100 parts by weight of the thermoplastic resin (2) and the content of the plasticizer (3) (hereinafter, sometimes described as the content (3)) relative to 100 parts by weight of the thermoplastic resin (3) is preferably 10 parts by weight or more, more preferably 15 parts by weight or more, further preferably 20 parts by weight or more, especially preferably 24 parts by weight or more, and preferably 40 parts by weight or less, more preferably 35 parts by weight or less, further preferably 32 parts by weight or less, and especially preferably 30 parts by weight or less. When the content (2) and the content (3) are the above lower limit or more, the flexibility of the interlayer film is enhanced and the handling of the interlayer film is facilitated. When the content (2) and the content (3) are the above upper limit or less, the penetration resistance of laminated glass is further enhanced.

For the purpose of further heightening the sound insulating properties of laminated glass, it is preferred that the content (1) be larger than the content (2) and it is preferred that the content (1) be larger than the content (3).

From the viewpoint of further heightening the sound insulating properties of laminated glass, each of the absolute value of a difference between the content (2) and the content (1) and the absolute value of a difference between the content (3) and the content (1) is preferably 10 parts by weight or more, more preferably 15 parts by weight or more, and further preferably 20 parts by weight or more. Each of the absolute value of a difference between the content (2) and the content (1) and the absolute value of a difference between the content (3) and the content (1) is preferably 80 parts by weight or less, more preferably 75 parts by weight or less, and further preferably 70 parts by weight or less.

(Heat Shielding Compound)

It is preferred that the interlayer film contain a heat shielding compound. It is preferred that the first layer contain a heat shielding compound. It is preferred that the second layer contain a heat shielding compound.

It is preferred that the third layer contain a heat shielding compound. One kind of the heat shielding compound may be used alone and two or more kinds thereof may be used in combination.

It is preferred that the heat shielding compound be constituted of at least one kind of Ingredient X among a phthalocyanine compound, a naphthalocyanine compound, and an anthracyanine compound or be constituted of heat shielding particles. In this case, the heat shielding compound may be constituted of both of the Ingredient X and the heat shielding particles.

Ingredient X:

It is preferred that the interlayer film include at least one kind of Ingredient X among a phthalocyanine compound, a naphthalocyanine compound and an anthracyanine compound. It is preferred that the first layer contain the Ingredient X. It is preferred that the second layer contain the Ingredient X. It is preferred that the third layer contain the Ingredient X. The Ingredient X is a heat shielding compound. One kind of the Ingredient X may be used alone, and two or more kinds thereof may be used in combination.

The Ingredient X is not particularly limited. As the Ingredient X, conventionally known phthalocyanine compound, naphthalocyanine compound and anthracyanine compound can be used.

Examples of the Ingredient X include phthalocyanine, a derivative of phthalocyanine, naphthalocyanine, a derivative of naphthalocyanine, anthracyanine, and a derivative of anthracyanine, and the like. It is preferred that each of the phthalocyanine compound and the derivative of phthalocyanine have a phthalocyanine skeleton. It is preferred that each of the naphthalocyanine compound and the derivative of naphthalocyanine have a naphthalocyanine skeleton. It is preferred that each of the anthracyanine compound and the derivative of anthracyanine have an anthracyanine skeleton.

With regard to the interlayer film and laminated glass, from the viewpoint of further enhancing the heat shielding properties thereof, it is preferred that the Ingredient X be at least one kind selected from the group consisting of phthalocyanine, a derivative of phthalocyanine, naphthalocyanine and a derivative of naphthalocyanine, and it is more preferred that the Ingredient X be at least one kind among phthalocyanine and a derivative of phthalocyanine.

From the viewpoints of effectively enhancing the heat shielding properties and maintaining the visible light transmittance at a higher level over a long period of time, it is preferred that the Ingredient X contain vanadium atoms or copper atoms. It is preferred that the Ingredient X contain vanadium atoms and it is also preferred that the Ingredient X contain copper atoms. It is more preferred that the Ingredient X be at least one kind among phthalocyanine containing vanadium atoms or copper atoms and a derivative of phthalocyanine containing vanadium atoms or copper atoms. With regard to the interlayer film and laminated glass, from the viewpoint of still further enhancing the heat shielding properties thereof, it is preferred that the Ingredient X have a structural unit in which an oxygen atom is bonded to a vanadium atom.

In 100% by weight of the interlayer film or in 100% by weight of a layer containing the Ingredient X (a first layer, a second layer, or a third layer), the content of the Ingredient X is preferably 0.001% by weight or more, more preferably 0.005% by weight or more, further preferably 0.01% by weight or more, especially preferably 0.02% by weight or more, and preferably 0.2% by weight or less, more preferably 0.1% by weight or less, further preferably 0.05% by weight or less, and especially preferably 0.04% by weight or less. When the content of the Ingredient X is the above lower limit or more and the above upper limit or less, the heat shielding properties are sufficiently enhanced and the visible light transmittance is sufficiently heightened. For example, it is possible to make the visible light transmittance 70% or more.

Heat Shielding Particles:

It is preferred that the interlayer film include heat shielding particles. It is preferred that the first layer contain the heat shielding particles. It is preferred that the second layer contain the heat shielding particles. It is preferred that the third layer contain the heat shielding particles. The heat shielding particle is of a heat shielding compound. By the use of heat shielding particles, infrared rays (heat rays) can be effectively cut off. One kind of the heat shielding particles may be used alone, and two or more kinds thereof may be used in combination.

From the viewpoint of further heightening the heat shielding properties of laminated glass, it is more preferred that the heat shielding particles be metal oxide particles. It is preferred that the heat shielding particle be a particle (a metal oxide particle) formed from an oxide of a metal.

The energy amount of an infrared ray with a wavelength of 780 nm or longer which is longer than that of visible light is small as compared with an ultraviolet ray. However, the thermal action of infrared rays is large, and when infrared rays are absorbed into a substance, heat is released from the substance. As such, infrared rays are generally called heat rays. By the use of the heat shielding particles, infrared rays (heat rays) can be effectively cut off. In this connection, the heat shielding particle means a particle capable of absorbing infrared rays.

Specific examples of the heat shielding particles include metal oxide particles such as aluminum-doped tin oxide particles, indium-doped tin oxide particles, antimony-doped tin oxide particles (ATO particles), gallium-doped zinc oxide particles (GZO particles), indium-doped zinc oxide particles (IZO particles), aluminum-doped zinc oxide particles (AZO particles), niobium-doped titanium oxide particles, sodium-doped tungsten oxide particles, cesium-doped tungsten oxide particles, thallium-doped tungsten oxide particles, rubidium-doped tungsten oxide particles, tin-doped indium oxide particles (ITO particles), tin-doped zinc oxide particles and silicon-doped zinc oxide particles, lanthanum hexaboride ($LaB_6$) particles, and the like. Heat shielding particles other than these may be used. Since the heat ray shielding function is high, preferred are metal oxide particles, more preferred are ATO particles, GZO particles, IZO particles, ITO particles or tungsten oxide particles, and especially preferred are ITO particles or tungsten oxide particles. In particular, since the heat ray shielding function is high and the particles are readily available, preferred are tin-doped indium oxide particles (ITO particles), and also preferred are tungsten oxide particles.

With regard to the interlayer film and laminated glass, from the viewpoint of further enhancing the heat shielding properties thereof, it is preferred that the tungsten oxide particles be metal-doped tungsten oxide particles. Examples of the "tungsten oxide particles" include metal-doped tungsten oxide particles. Specifically, examples of the metal-doped tungsten oxide particles include sodium-doped tungsten oxide particles, cesium-doped tungsten oxide particles, thallium-doped tungsten oxide particles, rubidium-doped tungsten oxide particles, and the like.

With regard to the interlayer film and laminated glass, from the viewpoint of further enhancing the heat shielding properties thereof, cesium-doped tungsten oxide particles are especially preferred. With regard to the interlayer film and laminated glass, from the viewpoint of still further enhancing the heat shielding properties thereof, it is preferred that the cesium-doped tungsten oxide particles be tungsten oxide particles represented by the formula: $Cs_{0.33}WO_3$.

The average particle diameter of the heat shielding particles is preferably 0.01 µm or more, more preferably 0.02 µm or more, and preferably 0.1 µm or less and more preferably 0.05 µm or less. When the average particle diameter is the above lower limit or more, the heat ray shielding properties are sufficiently heightened. When the average particle diameter is the above upper limit or less, the dispersibility of heat shielding particles is enhanced.

The "average particle diameter" refers to the volume average particle diameter. The average particle diameter can be measured using a particle size distribution measuring apparatus ("UPA-EX150" available from NIKKISO CO., LTD.), or the like.

In 100% by weight of the interlayer film or in 100% by weight of a layer containing the heat shielding particles (a first layer, a second layer, or a third layer), each content of the respective kinds of heat shielding particles (in particular, the content of tungsten oxide particles) is preferably 0.01% by weight or more, more preferably 0.1% by weight or more, further preferably 1% by weight or more, especially preferably 1.5% by weight or more, and preferably 6% by weight or less, more preferably 5.5% by weight or less, further preferably 4% by weight or less, especially preferably 3.5% by weight or less, and most preferably 3% by weight or less. When the content of the heat shielding particles is the above lower limit or more and the above upper limit or less, the heat shielding properties are sufficiently enhanced and the visible light transmittance is sufficiently heightened.

(Metal Salt)

It is preferred that the interlayer film contain at least one kind of metal salt (hereinafter, sometimes described as Metal salt M) among an alkali metal salt, an alkaline earth metal salt, and a magnesium salt. It is preferred that the first layer contain the Metal salt M. It is preferred that the second layer contain the Metal salt M. It is preferred that the third layer contain the Metal salt M. By the use of the Metal salt M, controlling the adhesivity between the interlayer film and a lamination glass member such as a glass plate or the adhesivity between respective layers in the interlayer film is facilitated. One kind of the Metal salt M may be used alone and two or more kinds thereof may be used in combination.

It is preferred that the Metal salt M contain at least one kind of metal selected from the group consisting of Li, Na, K, Rb, Cs, Mg, Ca, Sr, and Ba. It is preferred that the metal salt contained in the interlayer film contain at least one kind of metal between K and Mg.

Moreover, it is more preferred that the Metal salt M be an alkali metal salt of an organic acid with 2 to 16 carbon atoms, an alkaline earth metal salt of an organic acid with 2 to 16 carbon atoms, and a magnesium salt of an organic acid with 2 to 16 carbon atoms, and it is further preferred that the Metal salt M be a magnesium carboxylate with 2 to 16 carbon atoms or a potassium carboxylate with 2 to 16 carbon atoms.

Although the magnesium carboxylate with 2 to 16 carbon atoms and the potassium carboxylate with 2 to 16 carbon atoms are not particularly limited, examples thereof include magnesium acetate, potassium acetate, magnesium propionate, potassium propionate, magnesium 2-ethylbutyrate, potassium 2-ethylbutanoate, magnesium 2-ethylhexanoate, potassium 2-ethylhexanoate, and the like.

The total of the contents of Mg and K in an interlayer film containing the Metal salt M or a layer containing the Metal salt M (a first layer, a second layer, or a third layer) is preferably 5 ppm or more, more preferably 10 ppm or more, further preferably 20 ppm or more, and preferably 300 ppm or less, more preferably 250 ppm or less, and further preferably 200 ppm or less. When the total of the contents of Mg and K is the above lower limit or more and the above upper limit or less, the adhesivity between the interlayer film and a glass plate or the adhesivity between respective layers in the interlayer film can be further well controlled.

(Ultraviolet Ray Screening Agent)

It is preferred that the interlayer film include an ultraviolet ray screening agent. It is preferred that the first layer contain an ultraviolet ray screening agent. It is preferred that the second layer contain an ultraviolet ray screening agent. It is preferred that the third layer contain an ultraviolet ray screening agent. By the use of an ultraviolet ray screening agent, even when the interlayer film and the laminated glass are used for a long period of time, the visible light transmittance becomes further difficult to be lowered. One kind of the ultraviolet ray screening agent may be used alone, and two or more kinds thereof may be used in combination.

Examples of the ultraviolet ray screening agent include an ultraviolet ray absorber. It is preferred that the ultraviolet ray screening agent be an ultraviolet ray absorber.

Examples of the ultraviolet ray screening agent include an ultraviolet ray screening agent containing a metal atom, an ultraviolet ray screening agent containing a metal oxide, an ultraviolet ray screening agent having a benzotriazole structure (a benzotriazole compound), an ultraviolet ray screening agent having a benzophenone structure (a benzophenone compound), an ultraviolet ray screening agent having a triazine structure (a triazine compound), an ultraviolet ray screening agent having a malonic acid ester structure (a malonic acid ester compound), an ultraviolet ray screening agent having an oxanilide structure (an oxanilide compound), an ultraviolet ray screening agent having a benzoate structure (a benzoate compound), and the like.

Examples of the ultraviolet ray screening agent containing a metal atom include platinum particles, particles in which the surface of platinum particles is coated with silica, palladium particles, particles in which the surface of palladium particles is coated with silica, and the like. It is preferred that the ultraviolet ray screening agent not be heat shielding particles.

The ultraviolet ray screening agent is preferably an ultraviolet ray screening agent having a benzotriazole structure, an ultraviolet ray screening agent having a benzophenone structure, an ultraviolet ray screening agent having a triazine structure or an ultraviolet ray screening agent having a benzoate structure, more preferably an ultraviolet ray screening agent having a benzotriazole structure or an ultraviolet ray screening agent having a benzophenone structure, and further preferably an ultraviolet ray screening agent having a benzotriazole structure.

Examples of the ultraviolet ray screening agent containing a metal oxide include zinc oxide, titanium oxide, cerium oxide, and the like. Furthermore, with regard to the ultraviolet ray screening agent containing a metal oxide, the surface thereof may be coated with any material. Examples of the coating material for the surface of the ultraviolet ray screening agent containing a metal oxide include an insulating metal oxide, a hydrolyzable organosilicon compound, a silicone compound, and the like.

Examples of the insulating metal oxide include silica, alumina, zirconia, and the like. For example, the insulating metal oxide has a band-gap energy of 5.0 eV or more.

Examples of the ultraviolet ray screening agent having a benzotriazole structure include 2-(2'-hydroxy-5'-methylphenyl)benzotriazole ("Tinuvin P" available from BASF Japan Ltd.), 2-(2'-hydroxy-3',5'-di-t-butylphenyl)benzotriazole ("Tinuvin 320" available from BASF Japan Ltd.), 2-(2'-hydroxy-3'-t-butyl-5-methylphenyl)-5-chlorobenzotriazole ("Tinuvin 326" available from BASF Japan Ltd.), and 2-(2'-hydroxy-3',5'-di-amylphenyl)benzotriazole ("Tinuvin 328" available from BASF Japan Ltd.). It is preferred that the ultraviolet ray screening agent be an ultraviolet ray screening agent having a benzotriazole structure containing a halogen atom and it is more preferred that the ultraviolet ray screening agent be an ultraviolet ray screening agent having a benzotriazole structure containing a chlorine atom, because those are excellent in ultraviolet ray screening performance.

Examples of the ultraviolet ray screening agent having a benzophenone structure include octabenzone ("Chimassorb 81" available from BASF Japan Ltd.), and the like.

Examples of the ultraviolet ray screening agent having a triazine structure include "LA-F70" available from ADEKA CORPORATION, 2-(4,6-diphenyl-1,3,5-triazine-2-yl)-5-[(hexyl)oxy]-phenol ("Tinuvin 1577FF" available from BASF Japan Ltd.), and the like.

Examples of the ultraviolet ray screening agent having a malonic acid ester structure include dimethyl 2-(p-methoxybenzylidene)malonate, tetraethyl-2,2-(1,4-phenylenedimethylidene)bismalonate, 2-(p-methoxybenzylidene)-bis(1,2,2,6,6-pentamethyl-4-piperidinyl)malonate, and the like.

Examples of a commercial product of the ultraviolet ray screening agent having a malonic acid ester structure include Hostavin B-CAP, Hostavin PR-25 and Hostavin PR-31 (any of these is available from Clariant Japan K.K.).

Examples of the ultraviolet ray screening agent having an oxanilide structure include a kind of oxalic acid diamide having a substituted aryl group and the like on the nitrogen atom such as N-(2-ethylphenyl)-N'-(2-ethoxy-5-t-butylphenyl)oxalic acid diamide, N-(2-ethylphenyl)-N'-(2-ethoxyphenyl)oxalic acid diamide and 2-ethyl-2'-ethoxy-oxanilide ("Sanduvor VSU" available from Clariant Japan K.K.).

Examples of the ultraviolet ray screening agent having a benzoate structure include 2,4-di-tert-butylphenyl-3,5-di-tert-butyl-4-hydroxybenzoate ("Tinuvin 120" available from BASF Japan Ltd.), and the like.

From the viewpoint of further suppressing the lowering in visible light transmittance after the lapse of a certain period of time, in 100% by weight of the interlayer film or in 100% by weight of a layer containing the ultraviolet ray screening agent (a first layer, a second layer, or a third layer), the content of the ultraviolet ray screening agent, for example, the content of the benzotriazole compound, is preferably 0.1% by weight or more, more preferably 0.2% by weight or more, further preferably 0.3% by weight or more, especially preferably 0.5% by weight or more, and preferably 2.5% by weight or less, more preferably 2% by weight or less, further preferably 1% by weight or less, and especially preferably 0.8% by weight or less. In particular, by setting the content of the ultraviolet ray screening agent to be 0.2% by weight or more in 100% by weight of a layer containing the ultraviolet ray screening agent, with regard to the interlayer film and laminated glass, the lowering in visible light transmittance thereof after the lapse of a certain period of time can be significantly suppressed.

(Oxidation Inhibitor)

It is preferred that the interlayer film include an oxidation inhibitor. It is preferred that the first layer contain an oxidation inhibitor. It is preferred that the second layer contain an oxidation inhibitor. It is preferred that the third layer contain an oxidation inhibitor. One kind of the oxidation inhibitor may be used alone, and two or more kinds thereof may be used in combination.

Examples of the oxidation inhibitor include a phenol-based oxidation inhibitor, a sulfur-based oxidation inhibitor, a phosphorus-based oxidation inhibitor, and the like. The phenol-based oxidation inhibitor is an oxidation inhibitor having a phenol skeleton. The sulfur-based oxidation inhibitor is an oxidation inhibitor containing a sulfur atom. The phosphorus-based oxidation inhibitor is an oxidation inhibitor containing a phosphorus atom.

It is preferred that the oxidation inhibitor be a phenol-based oxidation inhibitor or a phosphorus-based oxidation inhibitor.

Examples of the phenol-based oxidation inhibitor include 2,6-di-t-butyl-p-cresol (BHT), butyl hydroxyanisole (BHA), 2,6-di-t-butyl-4-ethylphenol, stearyl β-(3,5-di-t-butyl-4-hydroxyphenyl)propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenol), 1,1,3-tris-(2-methyl-hydroxy-5-t-butylphenyl)butane, tetrakis[methylene-3-(3',5'-butyl-4-hydroxyphenyl)propionate]methane, 1,3,3-tris-(2-methyl-4-hydroxy-5-t-butylphenol)butane, 1,3,5-trimethyl-2,4,6-tris(3,5-di-t-butyl-4-hydroxybenzyl)benzene, bis(3,3'-t-butylphenol)butyric acid glycol ester, bis(3-t-butyl-4-hydroxy-5-methylbenzenepropanoic acid) ethylenebis(oxyethylene), and the like. One kind or two or more kinds among these oxidation inhibitors are suitably used.

Examples of the phosphorus-based oxidation inhibitor include tridecyl phosphite, tris(tridecyl) phosphite, triphenyl phosphite, trinonylphenyl phosphite, bis(tridecyl)pentaerithritol diphosphite, bis(decyl)pentaerithritol diphosphite, tris(2,4-di-t-butylphenyl) phosphite, bis(2,4-di-t-butyl-6-methylphenyi)ethyl ester phosphorous acid, tris(2,4-di-t-butylphenyl) phosphite, 2,2'-methylenebis(4,6-di-t-butyl-1-phenyloxy)(2-ethylhexyloxy)phosphorus, and the like. One kind or two or more kinds among these oxidation inhibitors are suitably used.

Examples of a commercial product of the oxidation inhibitor include "IRGANOX 245" available from BASF Japan Ltd., "IRGAFOS 168" available from BASF Japan Ltd., "IRGAFOS 38" available from BASF Japan Ltd., "Sumilizer BHT" available from Sumitomo Chemical Co., Ltd., "IRGANOX 1010" available from BASF Japan Ltd., and the like.

With regard to the interlayer film and laminated glass, in order to maintain high visible light transmittance thereof over a long period of time, it is preferred that the content of the oxidation inhibitor be 0.1% by weight or more in 100% by weight of the interlayer film or in 100% by weight of the layer containing the oxidation inhibitor (a first layer, a second layer or a third layer). Moreover, since an effect commensurate with the addition of an oxidation inhibitor is not attained, it is preferred that the content of the oxidation inhibitor be 2% by weight or less in 100% by weight of the interlayer film or in 100% by weight of the layer containing the oxidation inhibitor.

(Other Ingredients)

Each of the first layer, the second layer, and the third layer may contain additives such as a coupling agent, a dispersing agent, a surfactant, a flame retardant, an antistatic agent, a pigment, a dye, an adhesive force regulating agent other than a metal salt, a moisture-resistance improving agent, a fluorescent brightening agent, and an infrared ray absorber, as necessary. One kind of these additives may be used alone and two or more kinds thereof may be used in combination.

(Laminated Glass)

FIG. 3 is a sectional view showing an example of laminated glass prepared with the interlayer film for laminated glass shown in FIG. 1.

The laminated glass 21 shown in FIG. 3 is provided with an interlayer film 11, a first lamination glass member 22, and a second lamination glass member 23. The interlayer film 11 is arranged between the first lamination glass member 22 and the second lamination glass member 23 to be sandwiched therebetween. The first lamination glass member 22 is arranged on a first surface of the interlayer film 11. The second lamination glass member 23 is arranged on a second surface opposite to the first surface of the interlayer film 11.

Examples of the lamination glass member include a glass plate, a PET (polyethylene terephthalate) film, and the like. As the laminated glass, laminated glass in which an interlayer film is sandwiched between a glass plate and a PET film or the like, as well as laminated glass in which an interlayer film is sandwiched between two glass plates, is included. The laminated glass is a laminate provided with a glass plate and it is preferred that at least one glass plate be used. It is preferred that each of the first lamination glass member and the second lamination glass member be a glass plate or a PET (polyethylene terephthalate) film and the interlayer film include at least one glass plate as the first lamination glass member or the second lamination glass member. It is especially preferred that both of the first lamination glass member and the second lamination glass member be glass plates.

Examples of the glass plate include a sheet of inorganic glass and a sheet of organic glass. Examples of the inorganic glass include float plate glass, heat ray-absorbing plate glass, heat ray-reflecting plate glass, polished plate glass, figured glass, wired plate glass, green glass, and the like. The organic glass is synthetic resin glass substituted for inorganic glass. Examples of the sheet of organic glass include a polycarbonate plate, a poly(meth)acrylic resin plate, and the like. Examples of the poly(meth)acrylic resin plate include a polymethyl (meth)acrylate plate, and the like.

Although respective thicknesses of the first lamination glass member and the second lamination glass member are not particularly limited, the thickness is preferably 1 mm or more and preferably 5 mm or less. When the lamination glass member is a glass plate, the thickness of the glass plate is preferably 1 mm or more and preferably 5 mm or less. When the lamination glass member is a PET film, the thickness of the PET film is preferably 0.03 mm or more and preferably 0.5 mm or less.

The method for producing the laminated glass is not particularly limited. For example, the interlayer film is sandwiched between the first lamination glass member and the second lamination glass member, and then, passed through pressure rolls or subjected to decompression suction in a rubber bag. Therefore, the air remaining between the first lamination glass member and the interlayer film and between the second lamination glass member and the interlayer film is removed. Afterward, the members are preliminarily bonded together at about 70 to 110° C. to obtain a laminate. Next, by putting the laminate into an autoclave or by pressing the laminate, the members are press-bonded together at about 120 to 150° C. and under a pressure of 1 to 1.5 MPa. In this way, laminated glass can be obtained.

The laminated glass can be used for automobiles, railway vehicles, aircraft, ships, buildings, and the like. It is preferred that the laminated glass be laminated glass for building or for vehicles and it is more preferred that the laminated glass be laminated glass for vehicles. The laminated glass can also be used for applications other than these applications. The laminated glass can be used for a windshield, side glass, rear glass, or roof glass of an automobile, and the like. Since the laminated glass is high in heat shielding properties and is high in visible light transmittance, the laminated glass is suitably used for automobiles.

The laminated glass is a kind of laminated glass constituting a head-up display (HUD). In the laminated glass, measured information such as the speed which is sent from a control unit and the like can be emitted from a display unit of the instrumental panel to be projected onto the windshield. As such, without making a driver of an automobile move his or her visual field downward, a front visual field and measured information can be visually observed simultaneously.

Hereinafter, the present invention will be described in more detail with reference to examples. The present invention is not limited only to these examples.

In polyvinyl acetal resins used, n-butyraldehyde which has 4 carbon atoms is used for the acetalization. With regard to the polyvinyl acetal resin, the acetalization degree (the butyralization degree), the acetylation degree, and the content of the hydroxyl group were measured by a method in accordance with JIS K6728 "Testing methods for polyvinyl butyral". In this connection, even in the cases of being measured according to ASTM D1396-92, numerical values similar to those obtained by a method in accordance with JIS K6728 "Testing methods for polyvinyl butyral" were exhibited.

EXAMPLE 1

Preparation of Composition for Forming First Layer:

To 100 parts by weight of a polyvinyl acetal resin shown in the following Table 1, 60 parts by weight of triethylene glycol di-2-ethylhexanoate (3GO), 0.2 parts by weight of Tinuvin 326 (2-(2'-hydroxy-3'-t-butyl-5-methylphenyl)-5-chlorobenzotriazole, "Tinuvin 326" available from BASF Japan Ltd.), and 0.2 parts by weight of BHT (2,6-di-t-butyl-p-cresol) were added and thoroughly kneaded with a mixing roll to obtain a composition for forming a first layer.

Preparation of Composition for Forming Second Layer and Third Layer:

To 100 parts by weight of a polyvinyl acetal resin shown in the following Table 1, 38 parts by weight of triethylene glycol di-2-ethylhexanoate (3GO), 0.2 parts by weight of Tinuvin 326 (2-(2'-hydroxy-3'-t-butyl-5-methylphenyl)-5-chlorobenzotriazole, "Tinuvin 326" available from BASF Japan Ltd.), and 0.2 parts by weight of BHT (2,6-di-t-butyl-p-cresol) were added and thoroughly kneaded with a mixing roll to obtain a composition for forming a second layer and a third layer.

Preparation of Interlayer Film:

The composition for forming a first layer and the composition for forming a second layer and a third layer were coextruded with a coextruder. In Example 1, the compositions were extruded into an interlayer film, after which the interlayer film was heated to 100° C. to 150° C. and held for a period of holding time of 5 minutes or less, and then, the temperature thereof was returned to ordinary temperature. A wedge-shaped interlayer film having a layered structure with a stack of a second layer/a first layer/a third layer was prepared. In this connection, interlayer films obtained in Example 1 and Examples 2 to 5 and Comparative Examples 1 and 2 described below were determined to have a minimum thickness at one end and a maximum thickness at the other end.

EXAMPLES 2 TO 4 AND COMPARATIVE EXAMPLE 1

An interlayer film was obtained in the same manner as that in Example 1 except that the kind and blending amount of each of the polyvinyl acetal resin and the plasticizer which are used for a composition for forming a first layer and a composition for forming a second layer and a third layer were set to those listed in the following Table 1 and the minimum thickness and the maximum thickness in the interlayer film were set to those listed in the following Table 1. Moreover, in Examples 2 to 4 and Comparative Example 1, each of the ultraviolet ray screening agent and the oxidation inhibitor of the same kind as that in Example 1 was blended in the same blending amount (0.2 parts by weight relative to 100 parts by weight of the polyvinyl acetal resin) as that in Example 1.

In Examples 2 to 4, with the use of a mold having a different shape from that in Example 1, the compositions were extruded into an interlayer film, after which the interlayer film was heated to 100° C. to 150° C. and held for a period of holding time of 5 minutes or less, and then, the temperature thereof was returned to ordinary temperature. In Comparative Example 1, with the use of a mold having the same shape as that in Example 1, the compositions were extruded into an interlayer film, after which the interlayer film was not heated to 100° C. to 150° C.

EXAMPLE 5 AND COMPARATIVE EXAMPLE 2

An interlayer film was obtained in the same manner as that in Example 1 except that the kind and blending amount of each of the polyvinyl acetal resin and the plasticizer which are used for a composition for forming a first layer and a composition for forming a second layer and a third layer were set to those listed in the following Table 1 and the die temperature was changed at the time of extrusion-molding the compositions into an interlayer film with the use of a mold being the same as that in Example 1. Moreover, in Example 5 and Comparative Example 2, each of the ultraviolet ray screening agent and the oxidation inhibitor of the same kind as that in Example 1 was blended in the same blending amount (0.2 parts by weight relative to 100 parts by weight of the polyvinyl acetal resin) as that in Example 1.

In Example 5 and Comparative Example 2, the compositions were extruded into an interlayer film, after which the interlayer film was heated to 100° C. to 150° C. and held for a period of holding time of 5 minutes or less, and then, the temperature thereof was returned to ordinary temperature.

EXAMPLE 6

Preparation of Composition for Forming Interlayer Film:
To 100 parts by weight of a polyvinyl acetal resin shown in the following Table 2, 40 parts by weight of triethylene glycol di-2-ethylhexanoate (3GO), 0.2 parts by weight of Tinuvin 326 (2-(2'-hydroxy-3'-t-butyl-5methylphenyl)-5-chlorobenzotriazole, "Tinuvin 326"-available from BASF Japan Ltd.), and 0.2 parts by weight of BHT (2,6-di-t-butyl-p-cresol) were added and thoroughly kneaded with a mixing roll to obtain a composition for forming an interlayer film.
Preparation of Interlayer Film:
The composition for forming an interlayer film was extruded with an extruder. In Example 6, the composition was extruded into an interlayer film, after which the interlayer film was heated to 100° C. to 150° C. and held for a period of holding time of 5 minutes or less, and then, the temperature thereof was returned to ordinary temperature. A wedge-shaped single-layered interlayer film was prepared. In this connection, interlayer films obtained in Example 6 and Examples 7 to 9 and Comparative Examples 3, 4 described below were determined to have a minimum thickness at one end and a maximum thickness at the other end.

EXAMPLES 7, 8 AND COMPARATIVE EXAMPLE 3

An interlayer film was obtained in the same manner as that in Example 6 except that the kind and blending amount of each of the polyvinyl acetal resin and the plasticizer which are used for a composition for forming an interlayer film were set to those listed in the following Table 2 and the minimum thickness and the maximum thickness in the interlayer film were set to those listed in the following Table 1. Moreover, in Examples 7, 8 and Comparative Example 3, each of the ultraviolet ray screening agent and the oxidation inhibitor of the same kind as that in Example 6 was blended in the same blending amount (0.2 parts by weight relative to 100 parts by weight of the polyvinyl acetal resin) as that in Example 6.

In Examples 7 and 8, with the use of a mold having a different shape from that in Example 6, the composition was extruded into an interlayer film, after which the interlayer film was heated to 100° C. to 150° C. and held for a period of holding time of 5 minutes or less, and then, the temperature thereof was returned to ordinary temperature. In Comparative Example 3, with the use of a mold being the same as that in Example 6, the composition was extruded into an interlayer film, after which the interlayer film was not heated to 100° C. to 150° C.

EXAMPLE 9 AND COMPARATIVE EXAMPLE 4

An interlayer film was obtained in the same manner as that in Example 6 except that the kind and blending amount of each of the polyvinyl acetal resin and the plasticizer which are used for a composition for forming an interlayer film were set to those listed in the following Table 2 and the die temperature was changed at the time of extrusion-molding the composition into an interlayer film with the use of a mold being the same as that in Example 6. Moreover, in Example 9 and Comparative Example 4, each of the ultraviolet ray screening agent and the oxidation inhibitor of the same kind as that in Example 6 was blended in the same blending amount (0.2 parts by weight relative to 100 parts by weight of the polyvinyl acetal resin) as that in Example 6.

In Example 9 and Comparative Example 4, the composition was extruded into an interlayer film, after which the interlayer film was heated to 100° C. to 150° C. and held for a period of holding time of 5 minutes or less, and then, the temperature thereof was returned to ordinary temperature.

(Evaluation)
(1) Thickness

The obtained interlayer film was measured for the amount (X), (X1) of change in the thickness within each segment (X), (X1) extending between positions apart from the one end of the interlayer film by $(6+0.2 \times A)$ cm to $(14+0.2 \times A)$ cm (A represents an integer of 0 to 249). The interlayer film was evaluated for the largest value among 250 values of the amount (X), (X1) of change in the thickness (the largest value of the amount of change in the thickness) and the smallest value among 250 values of the amount (X), (X1) of change in the thickness (the smallest value of the amount of change in the thickness). The absolute value of a difference between the largest value of the amount (X), (X1) of change in the thickness and the smallest value of the amount (X), (X1) of change in the thickness was determined. The absolute value of a difference between the maximum thickness and the minimum thickness was determined within a segment (X), (X1) extending from a position apart from the one end of the interlayer film by 10 cm toward the other end to a position apart from the one end by 598 cm toward the other end.

In this connection, a segment extending between positions apart from the one end of an interlayer film by 6 cm to 63.8 cm corresponds to the display corresponding region of the interlayer film in the respective examples and comparative examples.

(2) Double Images (1)

A pair of glass plates (clear glass, the size of 510 mm×910 mm, 2.0 mm in thickness) was prepared. An interlayer film with a size corresponding to the size of the glass plate was sandwiched between the pair of glass plates to obtain a laminate. As shown in FIG. 4, the obtained laminate was fitted into a frame of an EPDM-made rubber tube (frame member). The rubber tube had a width of 15 mm. Next, the laminate fitted into a frame of an EPDM-made rubber tube was preliminarily press-bonded by a vacuum bag method. The preliminarily press-bonded laminate was subjected to press-bonding at 150° C. and a pressure of 1.2 MPa with the use of an autoclave to obtain a sheet of laminated glass.

The sheet of laminated glass obtained was installed at a position of the windshield. The information to be displayed, which is emitted from a display unit installed below the sheet of laminated glass, was reflected in the sheet of laminated glass to visually confirm the presence or absence of double images at a prescribed position (at the center position of the display corresponding region). The double images were judged according to the following criteria.

[Criteria for Judgment in Double Images (1)]

○: Double images are not confirmed.

x: Double images are confirmed.

(3) Double Images (2)

A sheet of laminated glass obtained in the evaluation for the above-mentioned (2) Double images (1) was prepared.

The sheet of laminated glass obtained was installed at a position of the windshield. The information to be displayed, which is emitted from a display unit installed below the sheet of laminated glass, was reflected in the sheet of laminated glass to visually confirm the presence or absence of double images at a prescribed position (over the whole display corresponding region). The double images were judged according to the following criteria.

[Criteria for Judgment in Double Images (2)]

○○: Double images are not confirmed.

○: Double images are confirmed very slightly but are at a level causing no influence in practical use.

x: The sheet satisfies neither the criterion for judgment of ○○ nor the criterion for judgment of ○.

The details and the results are shown in the following Tables 1 and 2.

TABLE 1

| | | | | Example 1 | Example 2 | Example 3 | Example 4 | Comparative Example 1 | Example 5 | Comparative Example 2 |
|---|---|---|---|---|---|---|---|---|---|---|
| Second layer | Polyvinyl acetal resin | Content of hydroxyl group | mol % | 30.5 | 30.5 | 30.5 | 30.5 | 30.5 | 30.5 | 30.5 |
| | | Acetylation degree | mol % | 1 | 1 | 1 | 1 | 1 | 1 | 1 |
| | | Acetalization degree | mol % | 68.5 | 68.5 | 68.5 | 68.5 | 68.5 | 68.5 | 68.5 |
| | | Content | Parts by weight | 100 | 100 | 100 | 100 | 100 | 100 | 100 |
| | Plasticizer | Kind | | 3GO | 3GO | 3GO | 3GO | 3GO | 3GO | 3GO |
| | | Content | Parts by weight | 38 | 38 | 38 | 38 | 38 | 38 | 38 |
| First layer | Polyvinyl acetal resin | Content of hydroxyl group | mol % | 22 | 22 | 22 | 22 | 22 | 22 | 22 |
| | | Acetylation degree | mol % | 13 | 13 | 13 | 13 | 13 | 13 | 13 |
| | | Acetalization degree | mol % | 65 | 65 | 65 | 65 | 65 | 65 | 65 |
| | | Content | Parts by weight | 100 | 100 | 100 | 100 | 100 | 100 | 100 |
| | Plasticizer | Kind | | 3GO | 3GO | 3GO | 3GO | 3GO | 3GO | 3GO |
| | | Content | Parts by weight | 60 | 60 | 60 | 60 | 60 | 60 | 60 |
| Third layer | Polyvinyl acetal resin | Content of hydroxyl group | mol % | 30.5 | 30.5 | 30.5 | 30.5 | 30.5 | 30.5 | 30.5 |
| | | Acetylation degree | mol % | 1 | 1 | 1 | 1 | 1 | 1 | 1 |
| | | Acetalization degree | mol % | 68.5 | 68.5 | 68.5 | 68.5 | 68.5 | 68.5 | 68.5 |
| | | Content | Parts by weight | 100 | 100 | 100 | 100 | 100 | 100 | 100 |
| | Plasticizer | Kind | | 3GO | 3GO | 3GO | 3GO | 3GO | 3GO | 3GO |
| | | Content | Parts by weight | 38 | 38 | 38 | 38 | 38 | 38 | 38 |
| Evaluation | Minimum thickness in interlayer film | | μm | 800 | 800 | 800 | 800 | 800 | 800 | 800 |
| | Maximum thickness in interlayer film | | μm | 1200 | 2300 | 2700 | 1050 | 1200 | 1200 | 1200 |
| | Wedge angle | | mrad | 0.4 | 1.5 | 1.9 | 0.25 | 0.4 | 0.4 | 0.4 |
| | Largest value of amount of change in thickness within segment (X), (X1) | | μm | 48 | 136 | 168 | 36 | 64 | 45 | 50 |
| | Smallest value of amount of change in thickness within segment (X), (X1) | | μm | 16 | 104 | 136 | 4 | 16 | 13 | 16 |
| | Absolute value of difference between largest value of amount of change in thickness and smallest value of amount of change in thickness within segment (X), (X1) | | μm | 32 | 32 | 32 | 32 | 48 | 32 | 34 |
| | Double images (1) | | | ○ | ○ | ○ | ○ | X | ○ | X |
| | Double images (2) | | | ○○ | ○○ | ○ | ○ | X | ○○ | X |

TABLE 2

|  |  |  |  | Example 6 | Example 7 | Example 8 | Comparative Example 3 | Example 9 | Comparative Example 4 |
|---|---|---|---|---|---|---|---|---|---|
| Interlayer film | Polyvinyl acetal resin | Content of hydroxyl group | mol % | 30.5 | 30.5 | 30.5 | 30.5 | 30.5 | 30.5 |
|  |  | Acetylation degree | mol % | 1 | 1 | 1 | 1 | 1 | 1 |
|  |  | Acetalization degree | mol % | 68.5 | 68.5 | 68.5 | 68.5 | 68.5 | 68.5 |
|  |  | Content | Parts by weight | 100 | 100 | 100 | 100 | 100 | 100 |
|  | Plasticizer | Kind |  | 3GO | 3GO | 3GO | 3GO | 3GO | 3GO |
|  |  | Content | Parts by weight | 40 | 40 | 40 | 40 | 40 | 40 |
| Evaluation |  | Minimum thickness in interlayer film | μm | 800 | 800 | 800 | 800 | 800 | 800 |
|  |  | Maximum thickness in interlayer film | μm | 1200 | 2700 | 1050 | 1200 | 1200 | 1200 |
|  |  | Wedge angle | mrad | 0.4 | 1.9 | 0.25 | 0.4 | 0.4 | 0.4 |
|  |  | Largest value of amount of change in thickness within segment (X), (X1) | μm | 48 | 168 | 36 | 64 | 45 | 50 |
|  |  | Smallest value of amount of change in thickness within segment (X), (X1) | μm | 16 | 136 | 4 | 16 | 13 | 16 |
|  |  | Absolute value of difference between largest value of amount of change in thickness and smallest value of amount of change in thickness within segment (X), (X1) | μm | 32 | 32 | 32 | 48 | 32 | 34 |
|  |  | Double images (1) |  | ○ | ○ | ○ | X | ○ | X |
|  |  | Double images (2) |  | ○○ | ○ | ○ | X | ○○ | X |

In this connection, sheets of laminated glass prepared with interlayer films obtained in Examples 1 to 5 respectively were evaluated for the sound insulating properties with sound transmission losses, and as a result, it was confirmed that the sheets of laminated glass were excellent in sound insulating properties.

EXPLANATION OF SYMBOLS 1, 1A: First layer
1Aa: Portion having sectional shape in thickness direction of rectangular shape
1Ab: Portion having sectional shape in thickness direction of wedge-like shape
2: Second layer
3: Third layer
11, 11A: Interlayer film
11a: One end
11b: The other end
11Aa: Portion having sectional shape in thickness direction of rectangular shape
11Ab: Portion having sectional shape in thickness direction of wedge-like shape
21: Laminated glass
22: First lamination glass member
23: Second lamination glass member
R1: Display corresponding region
R2: Peripheral region
R3: Shade region

The invention claimed is:

1. An interlayer film for laminated glass being used for laminated glass constituting a head-up display, having one end and the other end being at the opposite side of the one end, making the thickness of the other end larger than the thickness of the one end, and having a display corresponding region corresponding to a display area of the head-up display,
when a position apart from an end part at the one end side of the display corresponding region by 4 cm toward the other end is set to a start point, a position apart from an end part at the other end side of the display corresponding region by 4 cm toward the one end is set to an end point, spots are selected at 2-mm intervals from the start point to the end point, and the interlayer film is measured for the amount of change in the thickness within respective segments, centered on the respective spots, of 80 mm in a direction connecting the one end and the other end, the absolute value of a difference between the largest value among values of the amount of change in the thickness and the smallest value among values of the amount of change in the thickness being 8 μm or more and 32 μm or less,
the interlayer comprising a first layer which contains a polyvinyl acetal resin and a plasticizer and a second layer which contains a polyvinyl acetal resin and a plasticizer and is arranged on a first surface side of the first layer, and
the content of the plasticizer in the first layer relative to 100 parts by weight of the polyvinyl acetal resin in the first layer being larger than the content of the plasticizer in the second layer relative to 100 parts by weight of the polyvinyl acetal resin in the second layer.

2. The interlayer film for laminated glass according to claim 1, wherein the largest value among values of the amount of change in the thickness is 160 μm or less.

3. The interlayer film for laminated glass according to claim 1, further having a portion with a sectional shape in the thickness direction of a wedge-like shape within a segment extending from a position apart from the one end by 10 cm toward the other end to a position apart from the one end by 59.8 cm toward the other end.

4. The interlayer film for laminated glass according to claim 1, wherein
the content of the hydroxyl group of the polyvinyl acetal resin in the first layer is lower than the content of the hydroxyl group of the polyvinyl acetal resin in the second layer.

5. Laminated A laminated glass, comprising:
a first lamination glass member;
a second lamination glass member; and
the interlayer film for laminated glass according to claim 1,
the interlayer film for laminated glass being arranged between the first lamination glass member and the second lamination glass member.

6. An interlayer film for laminated glass, having one end and the other end being at the opposite side of the one end and making the thickness of the other end larger than the thickness of the one end,
- when 250 spots are selected at 2-mm intervals from a position apart from the one end of the interlayer film by 10 cm toward the other end and the interlayer film is measured for the amount of change in the thickness within respective 250 segments, centered on the respective 250 spots, of 80 mm in a direction connecting the one end and the other end, the absolute value of a difference between the largest value among 250 values of the amount of change in the thickness and the smallest value among 250 values of the amount of change in the thickness being 8 μm or more and 32 μm or less,
- the interlayer comprising a first layer which contains a polyvinyl acetal resin and a plasticizer and a second layer which contains a polyvinyl acetal resin and a plasticizer and is arranged on a first surface side of the first layer, and
- the content of the plasticizer in the first layer relative to 100 parts by weight of the polyvinyl acetal resin in the first layer being larger than the content of the plasticizer in the second layer relative to 100 parts by weight of the polyvinyl acetal resin in the second layer.

7. The interlayer film for laminated glass according to claim 6, wherein the largest value among values of the amount of change in the thickness is 160 μm or less.

8. The interlayer film for laminated glass according to claim 6, further having a portion with a sectional shape in the thickness direction of a wedge-like shape within a segment extending from a position apart from the one end by 10 cm toward the other end to a position apart from the one end by 59.8 cm toward the other end.

9. The interlayer film for laminated glass according to claim 6, wherein
- the content of the hydroxyl group of the polyvinyl acetal resin in the first layer is lower than the content of the hydroxyl group of the polyvinyl acetal resin in the second layer.

10. A laminated glass, comprising:
- a first lamination glass member;
- a second lamination glass member; and
- the interlayer film for laminated glass according to claim 6,
- the interlayer film for laminated glass being arranged between the first lamination glass member and the second lamination glass member.

* * * * *